US012348300B2

(12) United States Patent
Saye et al.

(10) Patent No.: US 12,348,300 B2
(45) Date of Patent: Jul. 1, 2025

(54) PROCESS AND SYSTEM FOR MIGRATING SATELLITE NETWORKS TO 3GPP 5G ARCHITECTURE

(71) Applicant: INTELSAT US LLC, McLean, VA (US)

(72) Inventors: Robert C. Saye, Sterling, VA (US); Luis F. Grueso Tenorio, Vienna, VA (US); Lance C. Hassan, Leesburg, VA (US)

(73) Assignee: INTELSAT US LLC, McLean, VA (US)

(*) Notice: Subject to any disclaimer, the term of this patent is extended or adjusted under 35 U.S.C. 154(b) by 488 days.

(21) Appl. No.: 17/902,564

(22) Filed: Sep. 2, 2022

(65) Prior Publication Data
US 2023/0074963 A1 Mar. 9, 2023

Related U.S. Application Data

(60) Provisional application No. 63/241,343, filed on Sep. 7, 2021.

(51) Int. Cl.
*H04B 7/185* (2006.01)
*H04L 61/5014* (2022.01)

(52) U.S. Cl.
CPC ..... *H04B 7/18517* (2013.01); *H04L 61/5014* (2022.05)

(58) Field of Classification Search
CPC ............ H04B 7/18517; H04L 61/5014; H04L 2101/622; H04L 61/103
See application file for complete search history.

(56) References Cited

U.S. PATENT DOCUMENTS

| 11,075,844 | B2  | 7/2021  | Akman et al.          |
|------------|-----|---------|-----------------------|
| 2016/0234690 | A1 | 8/2016 | Michalski et al. |
| 2020/0389396 | A1 | 12/2020 | Scott et al. |
| 2021/0051108 | A1 | 2/2021 | Akman et al. |
| 2021/0144669 | A1* | 5/2021 | Edge ................... H04W 12/037 |
| 2024/0421896 | A1* | 12/2024 | Foxworthy ........ H04B 7/18513 |

FOREIGN PATENT DOCUMENTS

CN        109361526 A        2/2019

OTHER PUBLICATIONS

"3rd Generation Partnership Project; Technical Specification Group Services and System Aspects; Wireless and wireline convergence access support for the 5G System (5GS) (Release 16)", 3GPP TS 23.316 V16.6.0 (Dec. 2020), Dec. 2020, pp. 1-83.
"Broadband Forum Technical Report, TR-456 AGF Functional Requirements", Aug. 2020, pp. 1-108, Issue 1.

* cited by examiner

*Primary Examiner* — Syed Ali
*Assistant Examiner* — Najeeb Ansari
(74) *Attorney, Agent, or Firm* — Sughrue Mion, PLLC

(57) ABSTRACT

A satellite terminal satellite exchanges data with a 5G core network of a cellular wireless network by obtaining an internet protocol (IP) address using a router or switch and a gateway. The IP address is obtained using dynamic host configuration protocol (DHCP). The router or switch and the gateway are positioned between a satellite teleport and the core network. The data is sent as packets with the IP address being the source address of the satellite terminal. As such, a legacy satellite terminal, with addition of a DHCP client, is able to access services of the 5G core network.

3 Claims, 21 Drawing Sheets

PROCESS AND SYSTEM FOR MIGRATING SATELLITE NETWORKS TO 3GPP 5G ARCHITECTURE

CROSS REFERENCE TO RELATED APPLICATION

This application claims benefit of priority to U.S. Provisional Application No. 63/241,343 filed Sep. 7, 2021 in the US Patent and Trademark Office, the contents of which are hereby incorporated by reference.

BACKGROUND

1. Technical Field

Example embodiments relate to adapting legacy satellite terminals to 3GPP networks, and relates to 5G Core, 5G access, satellite network and platform technologies. Example embodiments provide new capabilities within satellite next generation software defined networks, and defines a migration process to migrate/evolve legacy satellite networks to work ultimately with 5G Core and 5G access technologies.

2. Description of the Related Art

Satellite networks of the related art provide ground terminals on the transmit and receive side that connect to each other through a satellite to talk to each other over a satellite link. These networks and the communication with the satellite tend to be proprietary. Related art technologies currently provide no way to bring a satellite terminal into a 3GPP 5G architecture so that legacy satellite terminals may connect to a 5G core.

U.S. Pat. No. 11,075,844 is directed to an apparatus and method for providing hybrid access coordination. However, U.S. Pat. No. 11,075,844 does not disclose establishing a connection to a 5G core, or any other core. Rather, U.S. Pat. No. 11,075,844 assumes that a 5G core connection already exists and allows for selection of a best connection, whether 3G, 4G, 5G, Broadband, or satellite.

TR-456, AGF Functional Requirements describes functional requirements of an Access Gateway Function (AGF), which is a logical function deployed between the physical access media (e.g., DSL, PON, GE) in a wireline access network and a 5G core network. However, TR-456 fails to disclose any requirements, use case, or implementation of the AGF for application to a satellite network.

It is noted that previous attempts to modify satellite terminals to access a mobile packet core (e.g., a 4G core) have been unsuccessful.

SUMMARY

It is an aspect to provide a method and system to integrate legacy satellite terminals into a 3GPP 5G architecture so that the legacy satellite terminals may connect to a 5G core.

According to an aspect of one or more embodiments, there is provided a migration method comprising deploying a 5G Core with a point of presence (PoP) location; modifying an Access Gateway Function (AGF) to generate a unique identifier according to a 3GPP format, based on a MAC address of a satellite terminal; deploying the modified Access Gateway Function (AGF) in a legacy satellite teleport; and deploying a DHCP Client in the satellite terminal to transmit a DHCP request including the MAC address of the satellite terminal to the AGF.

According to other aspects of one or more embodiments, there is also provided a system including a satellite teleport; and a satellite terminal coupled to the satellite teleport via a satellite link, the satellite terminal comprising a DHCP Client function that handles layer-3 IP addressing and send a DHCP request including a MAC address of the satellite terminal, over the satellite link, to the satellite teleport, wherein the satellite teleport implements a modified Access Gateway Function (AGF) that receives the DHCP request including the MAC address of the satellite terminal, generates a an identifier based on the MAC address, and proxies connections to a 5G Core using the generated identifier.

BRIEF DESCRIPTION OF THE DRAWINGS

Example embodiments will be described below with reference to the accompanying drawings, in which.

DETAILED DESCRIPTION

Figure 1:
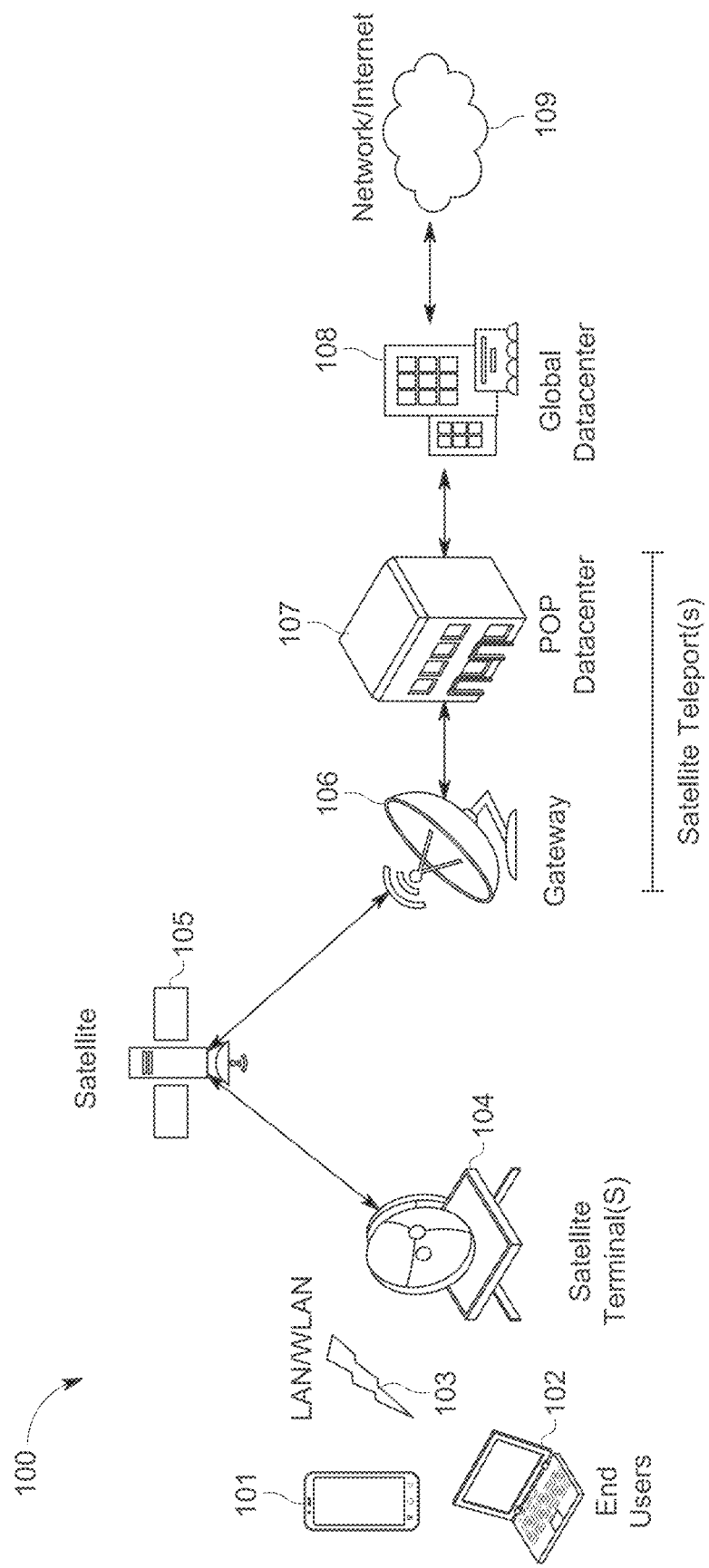
FIG. 1 is an example of an environment of a satellite network system.

According to some embodiments, a migration method may include deploying a 5G Core with a point of presence (PoP) location; modifying an Access Gateway Function (AGF) to generate a unique identifier according to a 3GPP format, based on a MAC address of a satellite terminal; deploying the modified Access Gateway Function (AGF) in a legacy satellite teleport; and deploying a DHCP Client in the satellite terminal, to transmit a DHCP request including the MAC address of the satellite terminal to the legacy satellite terminal.

According to some embodiments, a system may include a satellite teleport; and a satellite terminal coupled to the satellite teleport via a satellite link, the satellite terminal comprising a DHCP Client function that handles layer-3 IP addressing and sends a DHCP request including a MAC address of the satellite terminal, over the satellite link, to the satellite teleport, wherein the satellite teleport implements a modified Access Gateway Function (AGF) that receives the DHCP request including the MAC address of the satellite terminal, generates a an identifier based on the MAC address), and proxies connections to a 5G Core using the generated identifier.

In an example system, a satellite terminal may communicate via a satellite with a cellular core network. The satellite terminal may be configured to implement a first dynamic host configuration protocol (DHCP) layer and a first internet protocol (IP) layer.

In some embodiments, the satellite may communicate, through a teleport, with a router configured to implement a second DHCP layer. In some embodiments, the router may be a switch, for example, a Juniper spine switch, but this is a non-limiting example. The router may communicate with a gateway. The gateway may be configured to implement a third DHCP layer and may communicate with the cellular core network node of a cellular network. The cellular core network node may be configured to implement a second IP layer.

In some embodiments, the satellite terminal may also be configured to request, via the satellite, an IP address from the gateway.

In some embodiments, the router may also be configured to identify the request from the satellite terminal and request the IP address from the gateway using a request message.

In some embodiments, the gateway may also be configured to request, with a related request message, the IP address from the cellular core network node, receive the IP address from the cellular core network node, and send, via the router, the IP address to the satellite terminal.

In some embodiments, the satellite terminal may also be configured to send, via the first IP layer to the second IP layer, first packets bearing first user content to the cellular network using the IP address as a source address, and receive, via the first IP layer from the second IP layer, second packets bearing second user content from the cellular network, the second packets identifying the IP address as a destination address.

In some embodiments, the router may also be configured to insert a first identifier of the satellite terminal in a DHCP option 82 remote_id field of the first request message, wherein the first identifier is a MAC address of the satellite terminal, and send the first request message to the gateway.

In some embodiments, the gateway may also be configured to receive the first request message, compose a second identifier is a network specific identifier (NSI) based on the first identifier, wherein the second identifier is a subscription permanent identifier (SUPI), request the IP address using the second request message by sending the second identifier to the cellular core network node, and receive the IP address from a session management function (SMF) of the cellular core network node.

Various embodiments will now be described with reference to the drawings.

FIG. 1 illustrates an example of an environment of a satellite network system. As illustrated in FIG. 1, end user devices such as laptops, cell phones, and other similar devices connect to a satellite terminal via LAN or wireless LAN (WLAN), or other connection method. The satellite terminal processes signals to/from the end user devices, and processes the signals for communication over satellite to a satellite teleport. The satellite teleport typically includes a gateway and a point of presence (POP) data center. The gateway includes a satellite antenna for communication with the satellite, a modem, a digitzer, and radio frequency (RF) communication components, and may include compute resources for interfacing to and controlling the operation of the satellite antenna, the modem, the digitizer, and the RF communication components. In some embodiments, the compute resource may implement one or more of the modem, the digitizer, and the RF communication components in a virtual manner. In operation, the gateway processes signals to/from the satellite and provides the processed signals to the POP datacenter. The POP datacenter is communicatively connected to a global datacenter, which is, in turn communicatively connected to a network, such as the Internet. In operation, the POP datacenter receives and transmits signals to/from the gateway, processes the signals, and communicates the signals with the global datacenter, and to the Internet. Thus, the satellite network system allows the end user devices to communicate via the satellite to the network/Internet.

Current technologies involve legacy terminals that do not have a Third Generation Partnership Project (3GPP) User Equipment (UE) software stack which is required to give the terminals the ability to talk to a 5G Radio and/or a 5G Core. Here, 3GPP is used as an umbrella term for a number of standards organizations which develop protocols for mobile telecommunications.

3GPP is working on standards that will require terminals to have a 5G UE Stack and to talk to a radio on the other side of the satellite link. However, it is expected that 3GPP will take some time to complete work on the standards, and then it will be years before equipment is available that implements devices and systems consistent with the standards. It is thus impractical to wait for such developments. The present Application is an interim solution which prepares legacy terminals to leverage the future standards once the off the shelf equipment and technologies become available.

A 5G network allows for a convergence of all the disparate Operations and Business Support Systems (OSS/BSS) within Intelsat. Currently, there are multiple systems performing similar functions without a standards-based approach. A 5G architecture will allow management of every customer service: Subscriber Management system, Policy controller, Online Charging, and Offline Billing, with the same set of tools. A 5G architecture will also allow use of the same Key Performance Indicators (KPIs) for all customers and decrease the time required to troubleshoot issues, etc.

Thus, a goal for satellite terminals is seamless mobility between:
  Intra-Satellite beams (same satellites)
  Inter-Satellite beams (different satellites)
  Inter-Technology Handovers (Leo/MEO satellites, Terrestrial Mobile Network Operators).

In cable technologies, there are devices called Fixed Network Residential Gateways (FN-RGs), with similar limitations as satellite terminals. Similar to satellite terminals, the FN-RGs do not have a 3GPP UE stack. The 3GPP and Broadband Forum (BBF), which is a standards body for the cable world, developed a network function that would sit between the 5G Core and the FN-RG and proxy all of the 3GPP UE protocols for the FN-RG connection to the network.

The present Application takes an Access Gateway Function (AGF), which is the network function designed for the FN-RGs, and repurposes the AGF for satellite terminals.

Figure 2:
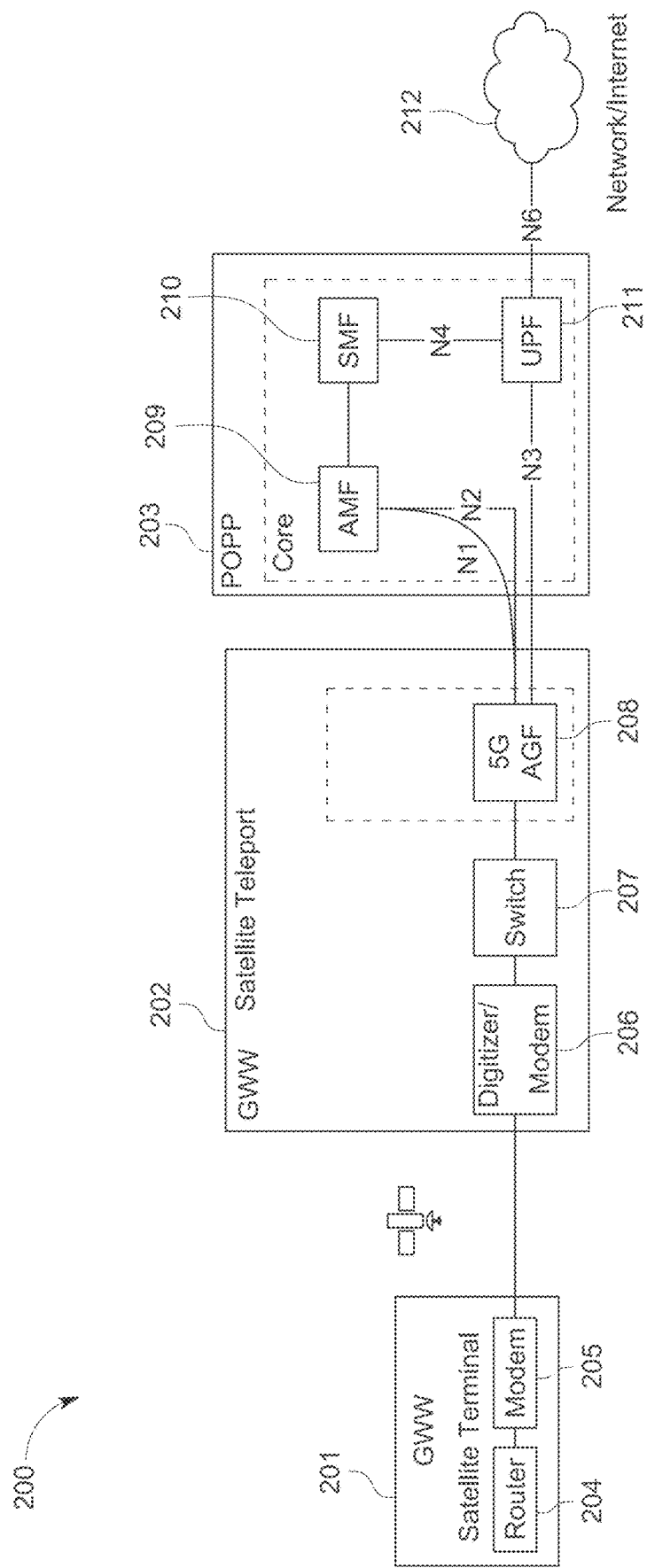
FIG. 2 is an example of an overview of device components of a system, according to some embodiments.

FIG. 2 is an example of an overview of device components of a satellite network system, according to some embodiments. As illustrated in FIG. 2, the device components of the system may include a satellite terminal, a satellite teleport, and a point of presence (PoP). The satellite terminal may include a DHCP Client and a modem. In some embodiments, the modem may be a digital video broadcasting second generation extentions (DVB-S2x) modem. The satellite teleport may include a demodulator, a switch, and the 5G access gateway function (AGF). In some embodiments, the switch (also referred to as a teleport switch) may be an L3 switch. In some embodiments, the switch may be a juniper spine switch. In some embodiments, the switch (also referred to as a router) and the gateway are co-located in a Teleport.

In some embodiments, the router is a DHCP relay configured to receive the DHCP Discovery message at a DHCP layer of a first protocol stack, use first conventional inter-layer primitives to push the DHCP Discovery message down to Ethernet (ETH) layer obtaining a first ETH message, move the ETH message to a second stack, use second conventional inter-layer primitives to move the ETH message up through an IEEE 802.1Q/ad layer, an IP layer, to a DHCP layer supporting option 82 and encapsulate the MAC address in the first request message at the DHCP layer supporting option 82.

The PoP may include a 5G core. The 5G core may include an access and mobile management function (AMF), a session management function (SMF), and a user plane function (UPF), connected as illustrated in FIG. 2. The PoP may be connected to the network/Internet. In some embodiments, the satellite terminal may be connected through the satellite to the satellite teleport via a DVB-S2x connection. In other embodiments, the digitizer/modem of the satellite teleport may be connected to the switch via an Ethernet connection. In some embodiments, the switch may be connected to the 5G AGF via a "V" IPoE connection.

The satellite terminal connection is layer-2, so it is not possible to simply use an AGF designed for cable technologies with a satellite terminal. Exemplary embodiments propose a new layer-3 connection. A router function (which may be virtual) on the terminal side may be added to handle the layer-3 IP addressing and initiate a dynamic host configuration protocol (DHCP) request over the satellite connection to a DHCP relay in the satellite teleport. The DHCP relay receives the DHCP request and forwards the DHCP request to the AGF using DHCP Option 82 with sub-option "remote-id" which may be the terminal's media access control (MAC) address.

Option 82 defines how the DHCP server may use the location of a DHCP client when assigning IP addresses or other parameters to the client.

In some embodiments, a satellite teleport includes a router and an AGF. In some embodiments, a satellite teleport also includes a gateway antenna, a digitizer, and the AGF. Teleports may be deployed regionally. For example, the continental US may be served by about ten teleports. In some embodiments, the combination of the router and the AGF, collocated in a teleport, will support full two-way communication of about 100,000 satellite terminals. Both control plane flows and (user) data plane flows illustrated in FIGS. 5-6 may flow in both directions through the router and the AGF.

Based on the usage of Option 82, the AGF may maintain a routing table including the IP address assigned by the DHCP process and the MAC address of the terminal. As an example, the table may be configured to accept the IP address as an index and provide the MAC address in response to a table read operation using the IP address as the index. This operation may be a part of the AGF acting as a proxy for AMF flows (N1), control plane flows (N2) and user data flows (N3).

The AGF, receiving the MAC address of the terminal creates a unique subscription permanent identifier (SUPI) using a 3GPP format for a SUPI containing a global cable identifier (GCI). The SUPI, as defined in 3GPP TS 23.501, is a globally unique 5G subscription permanent identifier. A SUPI is usually a string of 15 decimal digits. The first three digits represent the Mobile Country Code (MCC) while the next two or three form the Mobile Network Code (MNC) identifying the network operator. For privacy reasons, the SUPI from the 5G devices is not transferred in clear text, and is instead concealed inside a privacy preserving SUCI.

The AGF then proxies all N1, N2, and N3 connections to the 5G Core and starts a protocol data unit (PDU) session. The AGF receives an IP address from the Session Management Function (SMF) and forwards the IP address back to the terminal as the terminal IP address, and all future traffic is then sent using the terminal IP address.

The 5G N1 interface is a transparent interface from a 5G user equipment to a 5G access and mobility function (AMF) and the AMF is responsible for registration management, reachability management and connection management (also referred to as "n1"). The terminal has a MAC address as network information at the network layer (a network location). The 5G Core is configured to use a SUPI for recognizing user equipment (UE). In some embodiments, the AGF may be configured to proxy a 5G N1 interface by sending an authentication request based on the SUPI to the 5G Core. The authentication request is part of authentication and key agreement (AKA). The SUPI provided by the AGF may be configured to permit the 5G Core to perform AKA with the terminal by recognizing the MAC address of the terminal.

The N2 interface of 5G is used to perform control plane signaling related to context management of a UE and PDU session management of user plane packets (also referred to as "n2"). In some embodiments, the AGF may be configured to proxy the 5G N2 interface on behalf of the terminal.

The 5G N3 interface carries user data including user plane packets generated by a UE and user plane packets for which the UE is the destination (also referred to as "n3"). In some embodiments, the AGF may be configured to proxy the 5G N3 interface on behalf of the terminal.

The present Application thus allows migration of non-3GPP satellite terminals to a 5G core. The architecture and the evolution are illustrated by way of example in FIG. 2.

The present Application proposes to leverage the AGF specifications created by BBF and 3GPP, which were developed for non-3GPP cable modems, and to modify the AGF specifications to work with satellite terminals so that the satellite terminals may access a 3GPP 5G Core.

As illustrated in FIG. 2, the process to implement the architecture is as follows:

Deploy a 5G core within point of presence (PoP) locations. As used here, a point of presence (PoP) is an access point or physical location at which two or more networks or communication devices share a connection.

Deploy the AGF within legacy Teleports locations.

Integrate the AGF with proprietary hub and satellite access networks.

Begin cutover of legacy terminals to the AGF and 5G core.

Figure 3:
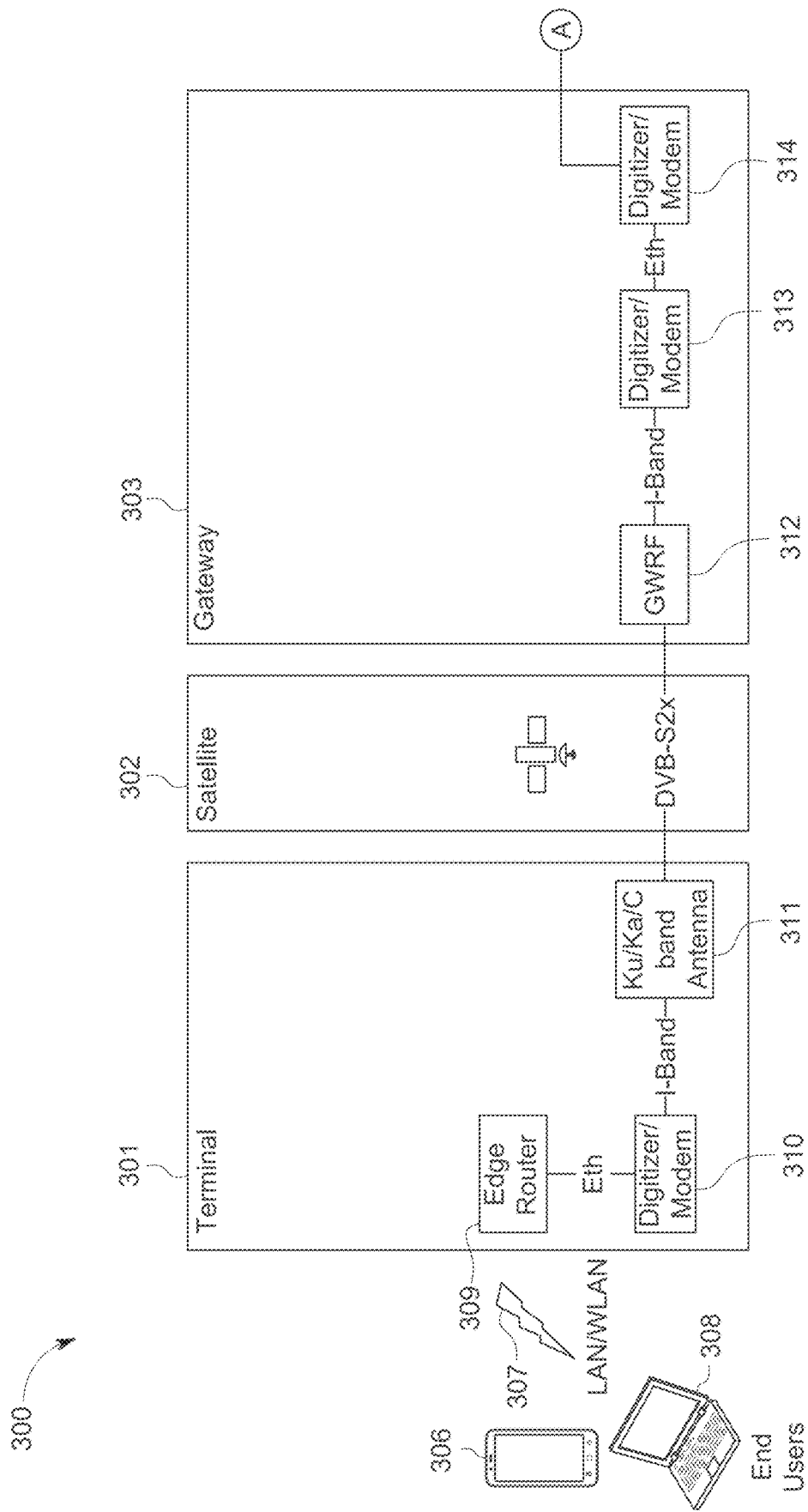
FIG. 3 is an example illustrating connectivity among device components of the system in additional detail, according to some embodiments.
Figure 3:
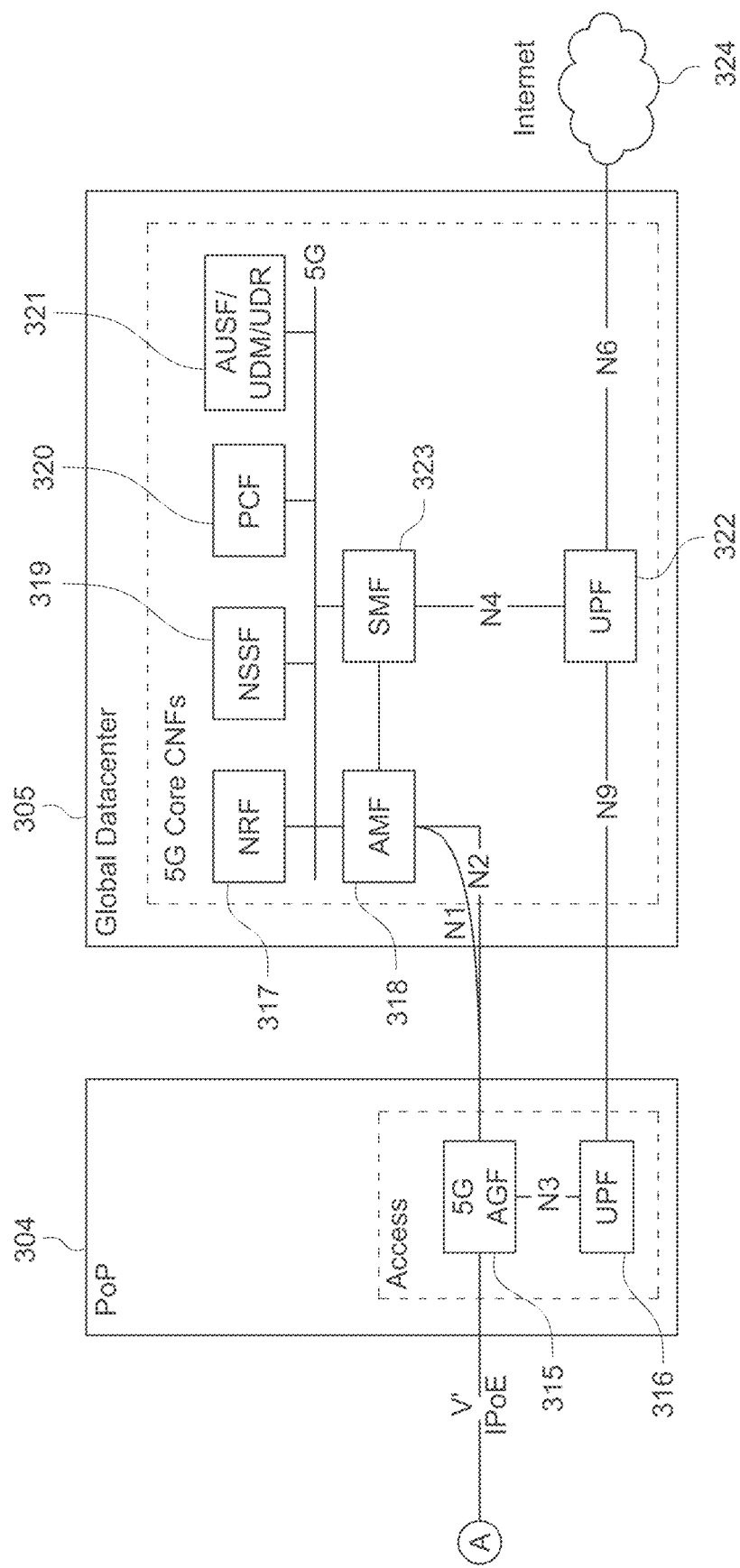
Figure 9:
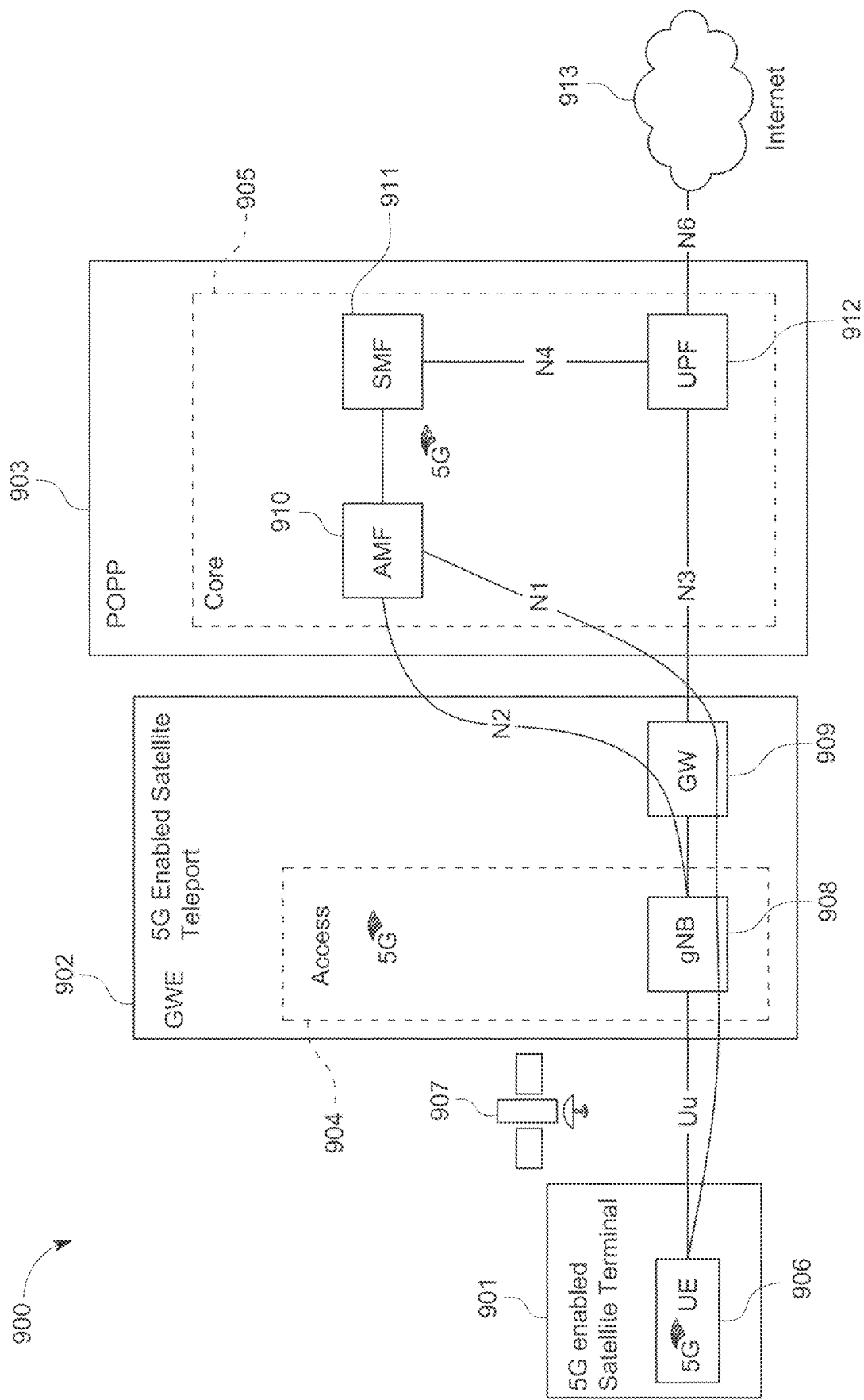
FIG. 9 is an example of a simplified end-to-end 5G connectivity, according to some embodiments.

Once the 3GPP standard for non-terrestrial networks is complete and vendors produce next generation 5G satellite terminals, there will be a combination of new 3GPP 5G enabled satellite Terminals that will connect directly to a Next Generation 5G radio access network (RAN) (5G gNB) at the satellite teleport (as illustrated in FIG. 9) and legacy satellite terminals that continue using the modified AGF for connectivity to the 5G core, as shown in FIGS. 2-3:

Accordingly, the modified AGF will continue to be used in conjunction with the gNB to support all satellite Terminals. The modified AGF may then be eventually phased out if desired, after all satellite Terminals have been upgraded or replaced by 3GPP 5G Terminals.

Exemplary embodiments discussed herein provide a unique process. Currently, AGF is not in wide use, and is not in use with satellite technologies. Use of AGF as proposed requires an extensive redesign of legacy systems in order for the legacy satellite systems to support 3GPP standards for global mobility. As discussed above, the present Application modifies an AGF to support onboarding legacy satellite terminals with a 5G core, or to facilitate network migration to 5G access.

The present Application also discloses a novel aspect of the use of a DHCP client behind the legacy satellite terminal to facilitate automation of access via the AGF.

An AGF, in some example embodiments, works by proxying 3GPP interfaces for the non-3GPP satellite terminals. Instead of adding a 5G UE stack to each terminal device, the AGF is modified to handle the 5G UE portion for all terminals. The AGF proxies 3 interfaces to the 5G core: N1, N2, and N3. The N1 is the interface from the UE to the Access and Mobility Function (AMF), which acts as the entry for UEs to the packet core. N2 is the interface between an Access Node and the AMF. The N3 is the interface between the Access Node and the User Plane Function (UPF), which talks to the Session Management Function (SMF) where IP addresses are handed out, is the session anchor, and all traffic departs the core towards the data network (internet or internal network).

Figure 4:
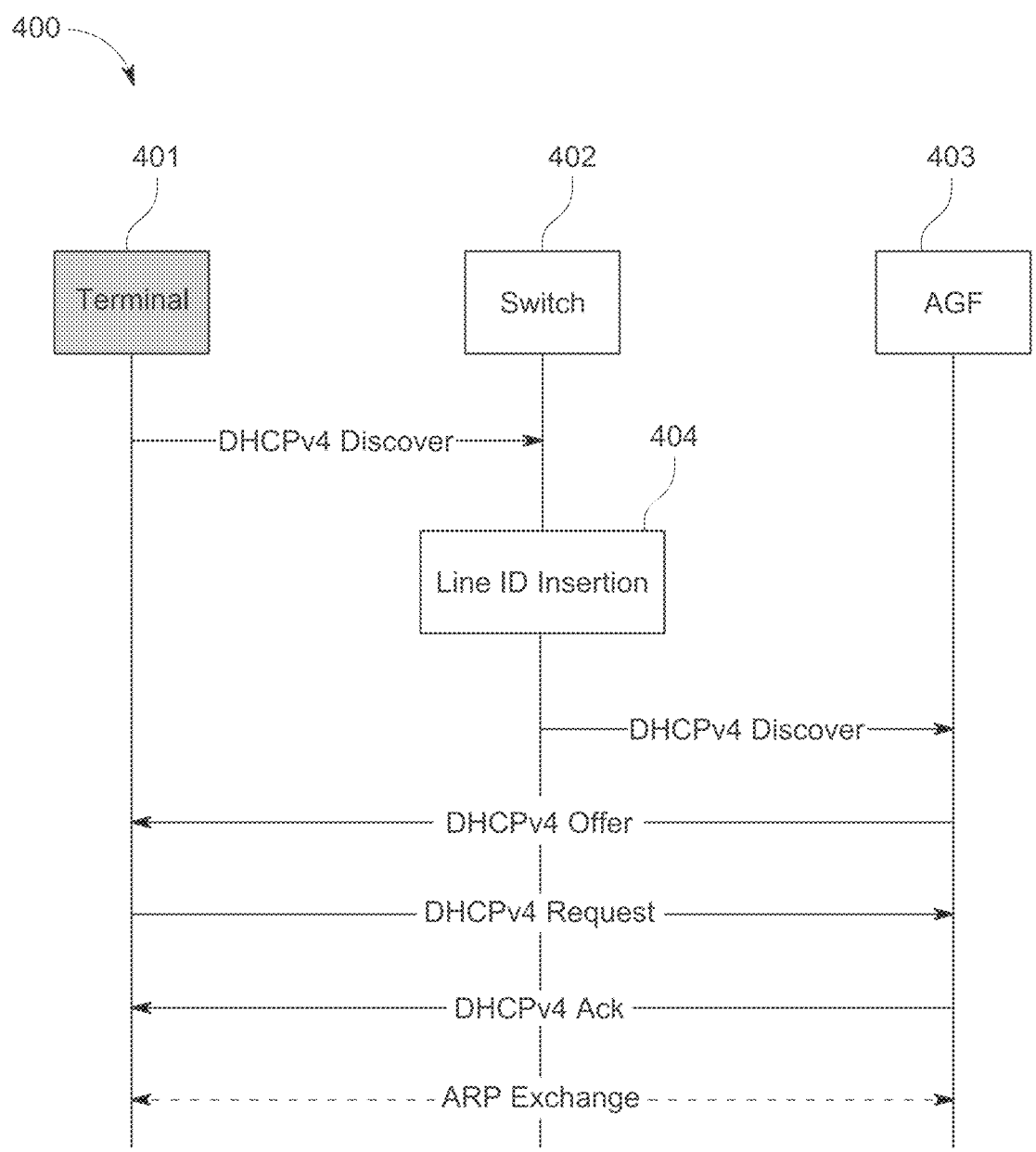
FIG. 4 is an example of a flowchart showing an exchange between a terminal, a switch and an access gateway function (AGF), according to some embodiments.

To initiate non-3GPP attachment to the satellite network, a router (which may in some embodiments be a virtual router implemented by a compute resource) is installed behind the modem in each terminal. The router is used to initiate a DHCP request when the Over-the-Air connection is established between the satellite terminal and the satellite teleport. DHCP requests arrive at the teleport router in the gateway that the terminals attach to. Gateway routers act as DHCP relays, and forward the MAC address to the AGF which uses the "remote-id" field to generate a 3GPP SUPI. The AGF then proxies the 3GPP SUPI to the 5G Core to initiate a session. FIG. 4 illustrates an example of a high-level call flow demonstrating the exchange, according to an embodiment.

FIG. 4 illustrates a terminal 401, a switch 402 and a gateway labelled as AGF 403. The terminal 401 is an example of the terminal 104 of FIG. 1. The switch 402 and AGF 403 correspond to the switch 50 and AGF-C 502 of FIG. 5 and are located at the satellite teleport. The switch 402 may also be included in a gateway. See the gateway 106 of FIG. 1, satellite gateway 514 of FIG. 5, gateway 616 of FIG. 6, NTN gateway 703 of FIG. 7, switch 802 of FIG. 8, GW 909 of FIG. 9, and GW 1015 of FIG. 10.

The goal of the messages of FIG. 4 is to perform address resolution and obtain an IP address for the terminal 401. Address resolution refers to the process of finding an address of a computer (the satellite terminal) in a network (the network including the cellular core network and the Internet generally).

The address resolution protocol (ARP) is a protocol used by the Internet Protocol (IP), RFC826, specifically IPv4, to map IP network addresses to hardware addresses used by a data link protocol. ARP is used when IPv4 is used over Ethernet.

The address is resolved using a protocol in which a piece of information (for example, the MAC address of the terminal 401) is provided to a server (AGF 403). In embodiments provided herein, the switch 402 inserts the MAC address of the terminal 401. The information received by the server allows the server to uniquely identify the network system for which the address was required and provide the required address. The address resolution procedure is completed when terminal 401 (the DHCP client) receives a response from the AGF 403 (DHCP server) containing an IP address to be used by an IP layer in the terminal 401.

In some embodiments of FIG. 4, the switch 402 is a router and functions as an edge router. 14. The system of claim 1, wherein the router functions as a datacenter spine switch. In some embodiments of FIG. 4, the switch 402 (also referred to as a router herein) functions as a DHCP server and is configured to act as a server toward DHCP clients such as those installed in the satellite terminal (see FIG. 5 item 505 "switch" and FIG. 5 504 "edge appliance").

FIG. 4 begins with a DHCP discover message from the terminal 401 to the switch 402.

At operation 404, the switch 402 performs Line ID Insertion. Line insertion provides network address information so that an IP address can be provided using AGF 403. An example of line insertion is DCHP option 82. Option 82 provides information about the network location of the terminal 401 (which is a DHCP client), and the DHCP server (for example, AGF 403) uses this information to obtain an IP address for the terminal 401 so that the terminal 401 can communicate with the cellular core network. For example, see FIG. 5 item 501, FIG. 6 601 which may further communicate with an application hosted or supported by a destination node (DN) 605. Regarding the DN 605 also see FIG. 1 the network/Internet 109.

The switch 402 then forwards the updated message to AGF 403.

AGF 403 sends a DHCPv4 offer message which is routed directly to the DHCP client at terminal 401.

Terminal 401 responds with a DHCPv4 request message.

The AGF 403 then responds with a DHCPv4 Ack message.

An ARP message exchange is then performed between the terminal 401 and the AGF 403 and the terminal 401 obtains an IP address for communication with the cellular core network, communication with the Network/Internet 109 and with the DN 605 including applications hosted or served by the DN 605.

Figure 5:
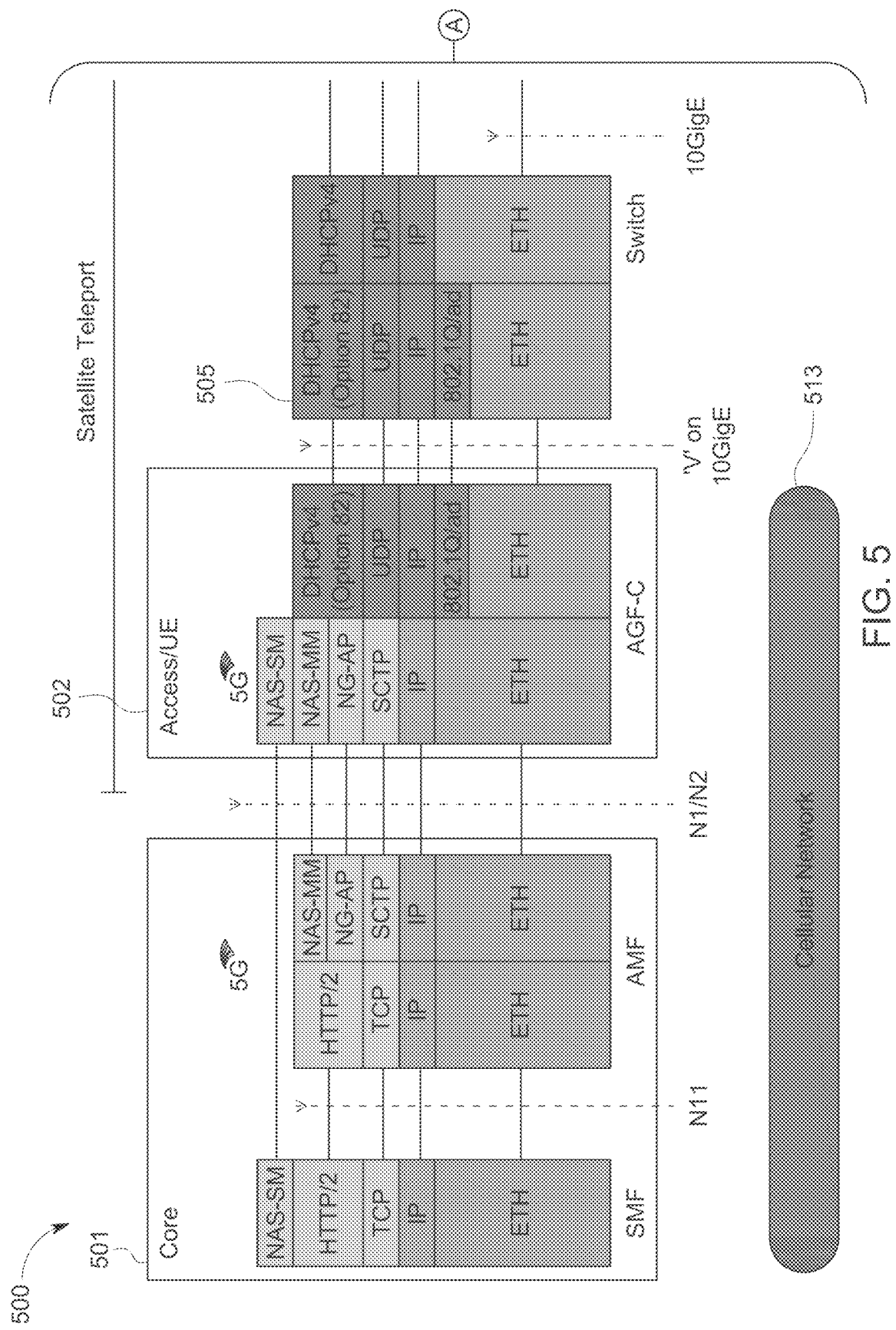
FIG. 5 is an example of a control plane stack diagram illustrating connectivity within the system, according to some embodiments.
Figure 5:
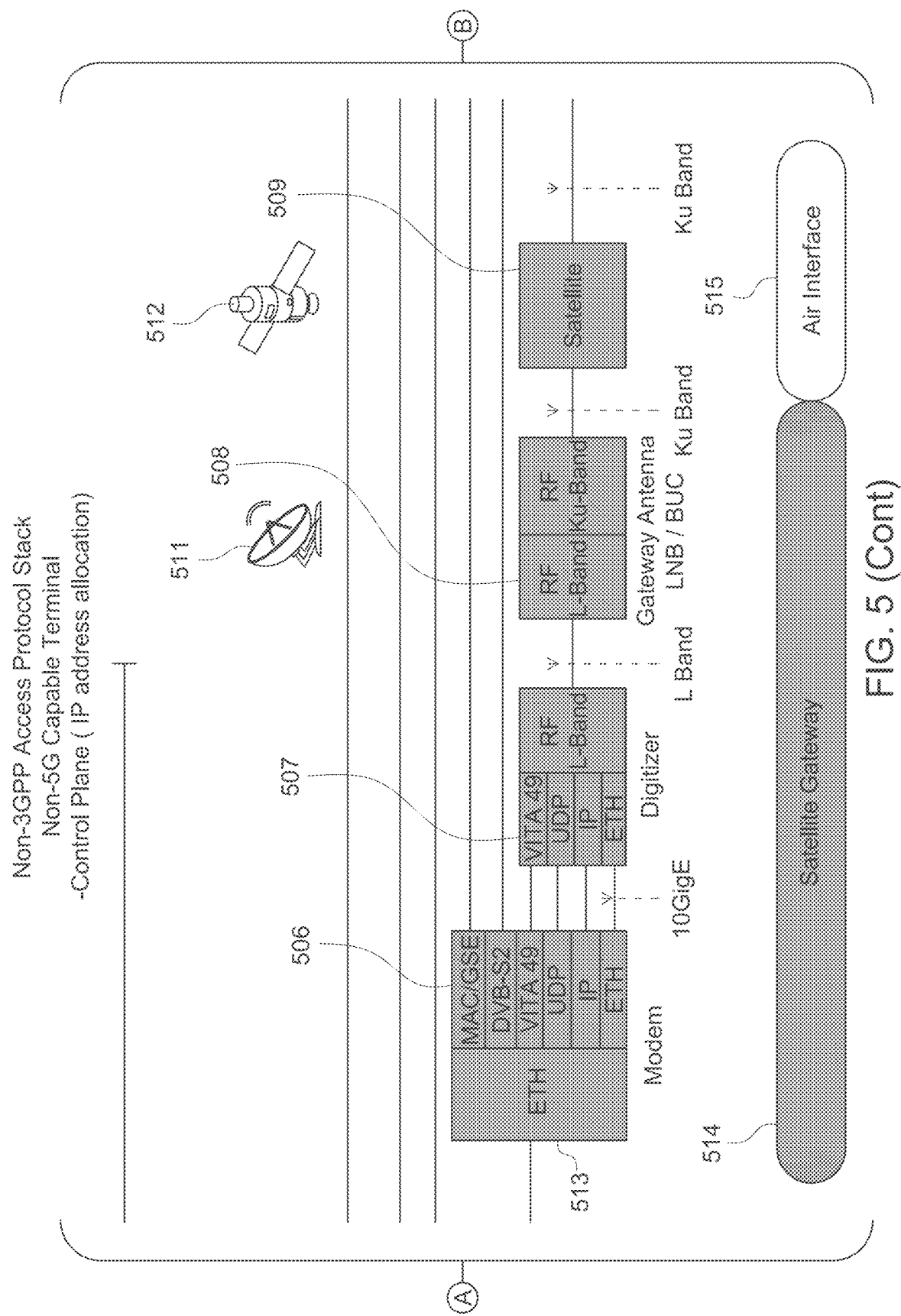
Figure 5:
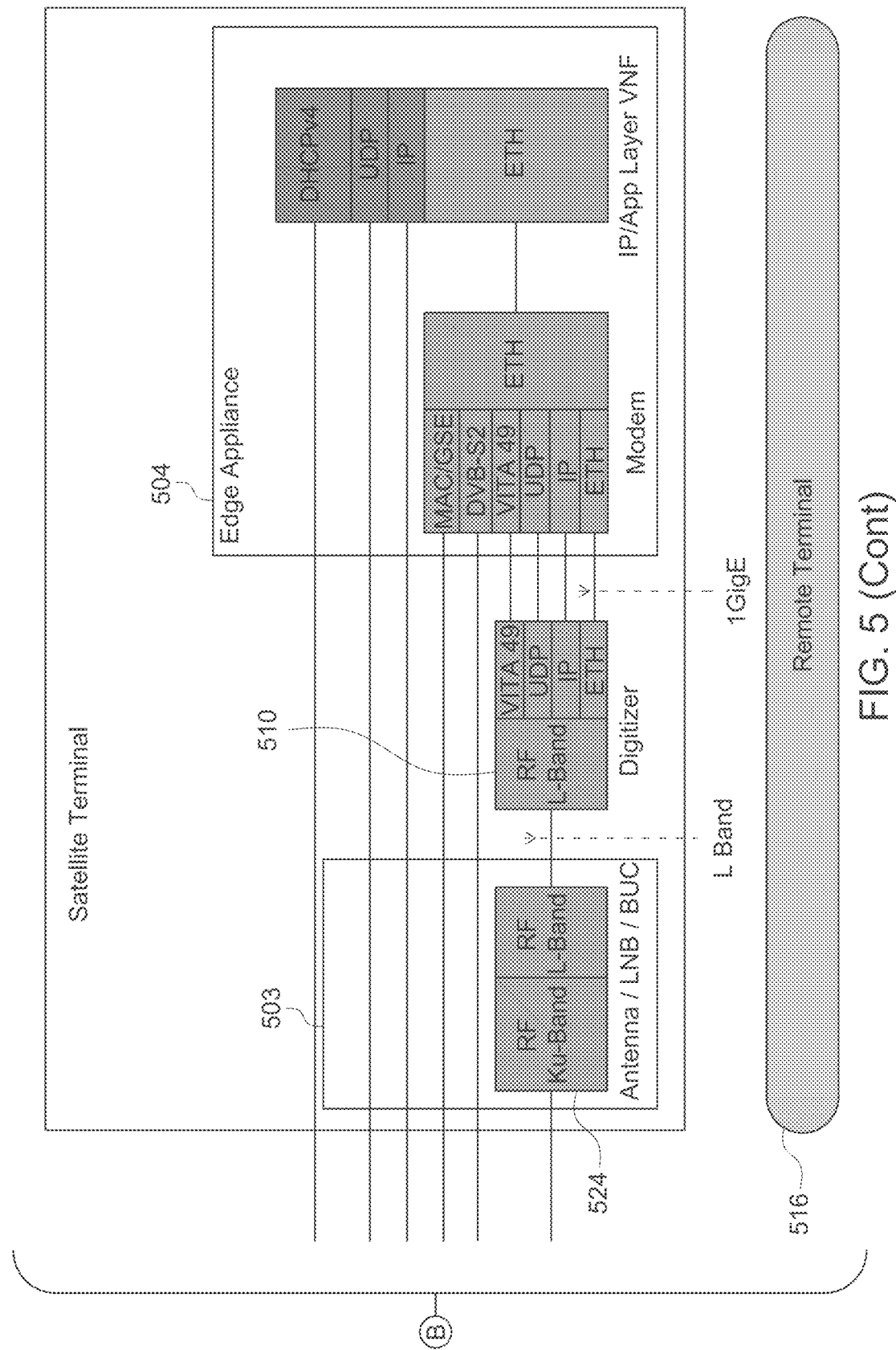

In summary, regarding FIG. 4 and also referring to FIG. 5, the satellite terminal requests the IP address using a DHCP discovery message and is provided, by way of the AGF, with the IP address.

Embodiments solve a problem of an existing legacy terminal not being able to utilize a 5G core. This problem means that terminal mobility is not seamless and satellite terminals cannot roam to partner networks. According to various embodiments described herein, a system and method are provided that allow early migration of legacy satellite terminal to work with 5G core technology, in advance of 3GPP standards for satellite terminals.

Embodiments provided herein include the architecture of the switch 207 and AGF 208 configured to support traffic flows from about 100,000 satellite terminals. Embodiments provided herein are thus scalable and provide an improvement for satellite terminals roaming to partner networks (mobility) and/or accessing Internet services.

The modified AGF allows non-3GPP satellite terminals to connect to a 3GPP 5G core, which enables support for many new use cases. For example, a 5G network allows creation of "slices," which are isolated end-to-end networks with differentiated 5G services for diverse customer requirements.

FIG. 5 is an example of a control plane stack diagram illustrating connectivity within the system, according to an embodiment. In some embodiments, a router/switch (in one non-limiting example, an L3 switch) acts as a DHCP relay. That is, in some embodiments, the switch is a DHCP relay configured to receive a DHCP Discovery message (from a satellite terminal) at a DHCP layer of a first protocol stack, use first inter-layer primitives to push the DHCP Discovery message down to an Ethernet (ETH) layer obtaining a first ETH message, move the ETH message at the same layer level to a second protocol stack, use second inter-layer primitives to move the ETH message up through an IEEE 802.1Q/ad layer and an IP layer, to a DHCP layer supporting option 82 and encapsulate the MAC address in the first message at the DHCP layer supporting option 82.

FIG. 5 provides layer diagrams of the switch 402 (FIG. 5 item 505) and the AGF 403 (FIG. 5 item 502). FIG. 5 illustrates that the switch 505 implements a DHCP function facing the terminal and a DHCP function implementing option 82 and facing the AGF. The switch 505 also implements a QoS function facing the AGF 502.

The DHCP layer of the switch 505 corresponds to the DHCP discussion of the switch 402 of FIG. 4.

Overall, in some embodiments of FIGS. 4-5, the satellite terminal is a DHCP client, the router functions as a DHCP relay in a control plane, and the first request message includes an encapsulation of the MAC address in a payload of the first request message.

Also, in some embodiments, the gateway maintains a table including the IP address and the MAC address, and the table is configured to accept the IP address as an index and provide the MAC address in response to a table read operation using the IP address as the index.

Regarding the QoS function of the switch 405 and the AGF-C 502 of FIG. 5, IEEE 802.1q is a networking standard that supports virtual local area networking (VLANs) on an IEEE 802.3 Ethernet network. The standard defines a system of VLAN tagging for Ethernet frames and the accompanying procedures to be used by bridges and switches in handling such frames. Within 802.1q, 802.1p may be supported. 802.1p is a quality of service (QoS)/class of service (CoS) method that operates at the MAC layer (Layer 2). Equipment that supports 802.1p can add and recognize a value that indicates the priority level of the Ethernet frame. 802.1p can help to ensure a high level of quality for real-time communications that are sensitive to latency, such as VoIP. 802.1p-enabled equipment prioritize traffic based on the priority value. 802.1p applies to only VLAN member interfaces that are configured to send and receive VLAN-tagged traffic. When 802.1p is enabled, the switch 505 marks outbound traffic from that interface. Switch 505 adds an 802.1q tag to Layer 2 Ethernet frames and copies the IP precedence value from the Layer 3 IP header to the priority code point (PCP) 802.1p field in 802.1q tag. See the QoS flows 709 from the satellite terminal (marked as CPE 701 in FIG. 7) to the AGF 704.

Figure 7:
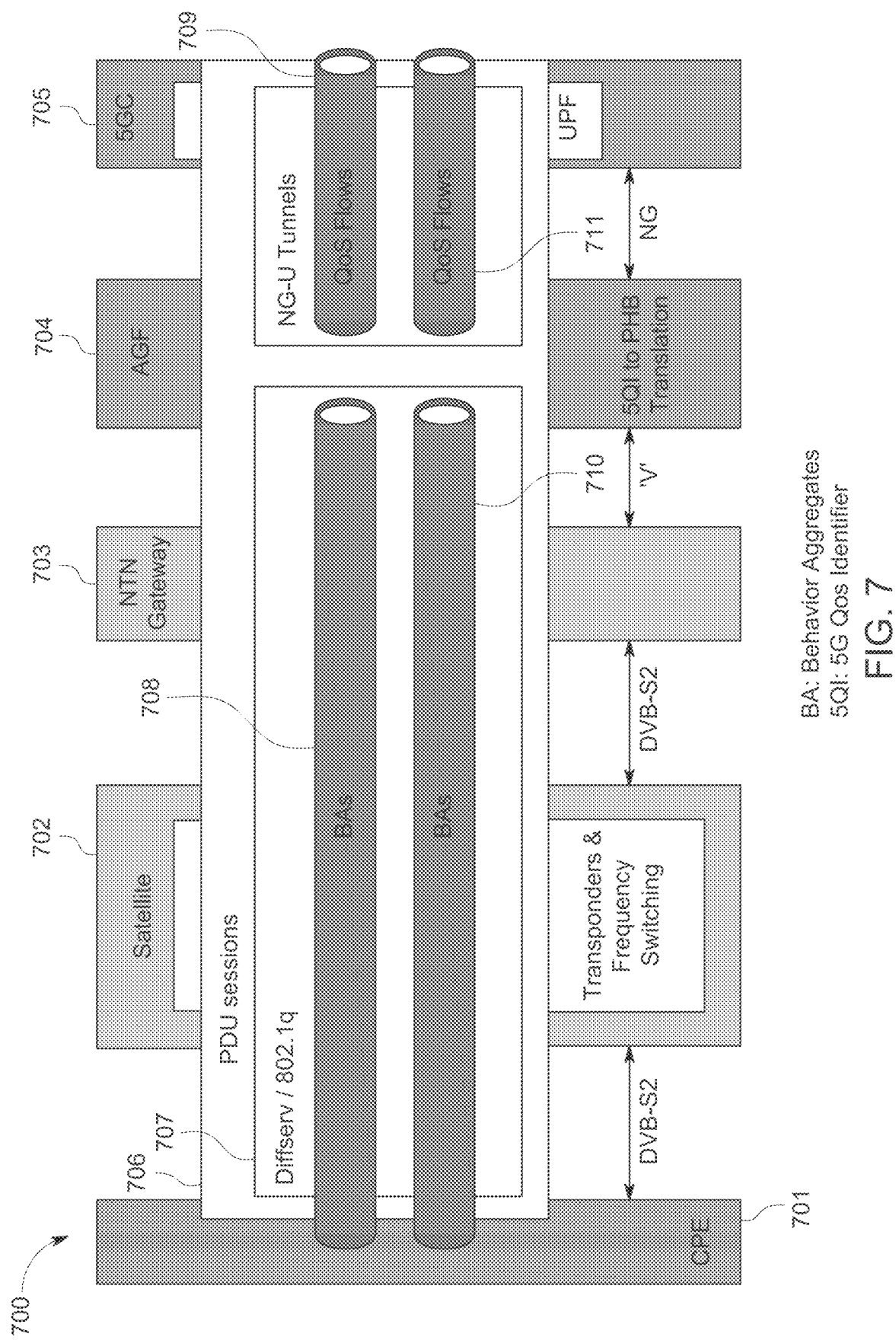
FIG. 7 is an example of an AGF with a 5G core and end-to-end quality of service (QoS), according to some embodiments.

Regarding QoS, as illustrated in FIG. 7, behavior aggregates ("BAs") flow from the satellite terminal to the AGF 704 and that QoS flows are defined from the AGF 704 to the 5g core network 705.

Overall, regarding FIGS. 4-7, the DHCP discovery message may include a quality of service (QoS) parameter indicating a first QoS level desired by the satellite terminal.

After the IP address is obtained, first packets from the satellite terminal are routed by a router (for example switch 402 of FIG. 4) toward a destination node (DN) over network bearers supporting the first QoS level, and the gateway is further configured to map the first QoS level to a first 5G QoS Class Identifier (QCI) (5QI) level by a 5QI parameter.

5QI (5G QoS Identifier) is a pointer to a set of QoS characteristics such as priority level, packet delay or packet error rate, etc. These QoS characteristics can either be standardized or non-standardized. There are different standardized 5QI values for different QoS flow types such as GBR, non-GBR and Delay Critical GBR flows.

5QI has some similarity to QCI of 4G cellular standards. However, 5QI applies to a flow, carried at some point in a bearer, while QCI applies to a bearer within which certain types of flows are expected. Also, see related information concerning EPS standardized QCI characteristics, defined in 3GPP TS 23.203.

As shown in FIG. 7 the first packets from the satellite terminal, in some embodiments, are forwarded by the gateway over network bearers configured by the 5QI parameter.

In flows back to the satellite terminal, second packets are forwarded to the gateway over second network bearers configured by the 5QI parameter, wherein the second packets originate at the DN (destination node). For convenience, packets originating from the satellite terminal have been referred to as "first packets," and packets flowing toward the satellite terminal have been referred to as "second packets."

In some embodiments, the QoS parameter includes three bits, each instance of the QoS parameter indicating one of eight QoS configurations. Also, the QoS parameter may be, for example, an Ethernet QoS parameter. For example, the QoS parameter, in some embodiments, is an IEEE 802.1Q/ad ETH (Ethernet) priority field.

As an overview, examples of messages according to some embodiments will be described below with respect to various figures.

In an example system, a satellite terminal (item 104) communicates via a satellite (item 105) with a cellular core network. Also see FIG. 13. The satellite terminal may be configured to implement a first dynamic host configuration protocol (DHCP) layer and a first internet protocol (IP) layer. See FIG. 4 for some messages involved in obtaining an IP address. Also see FIG. 8 with operation 808 illustrating line ID insertion and ARP exchange (bottom of FIG. 8).

Figure 6:
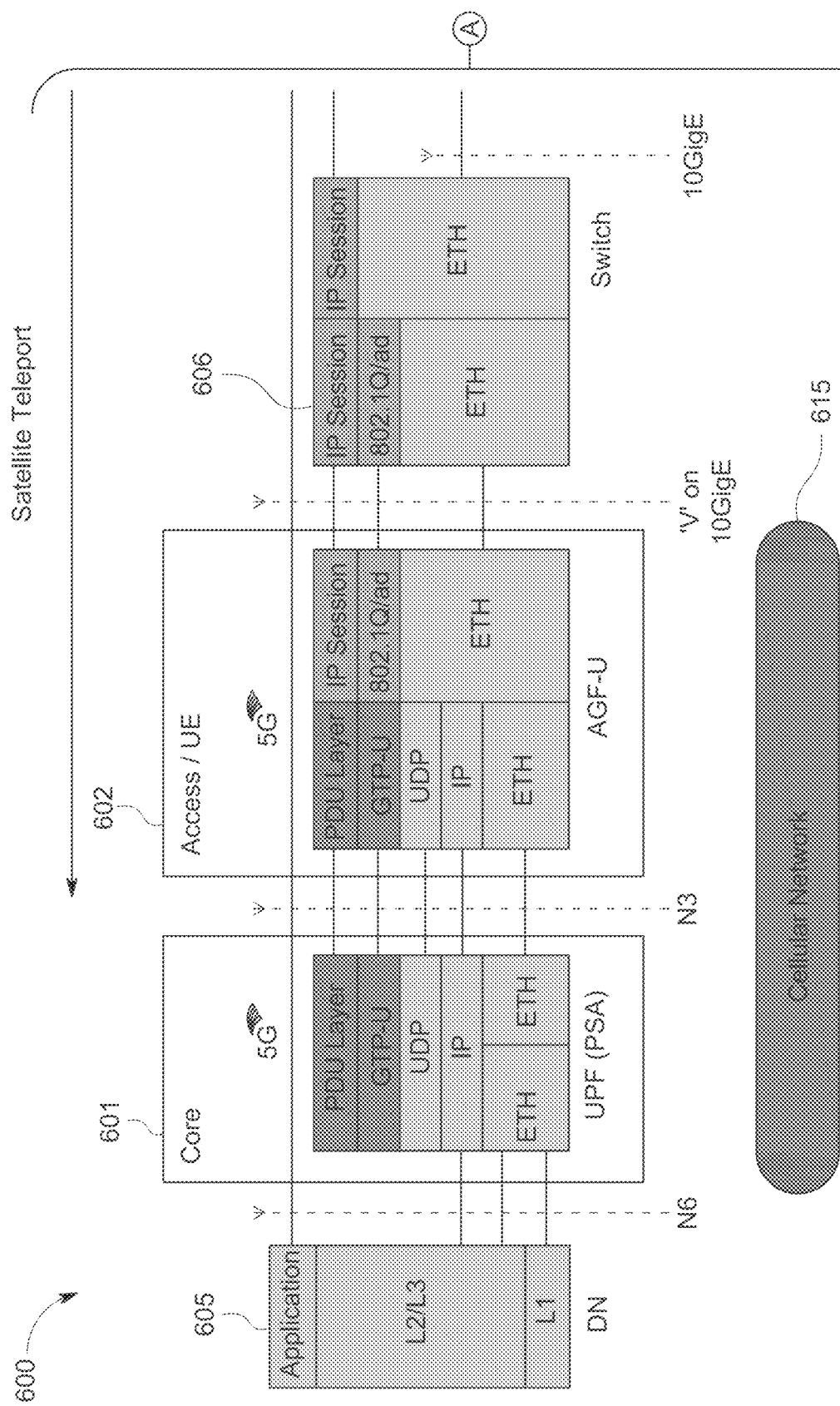
FIG. 6 is an example of a user plane stack diagram illustrating connectivity within the system, according to some embodiments.
Figure 6:
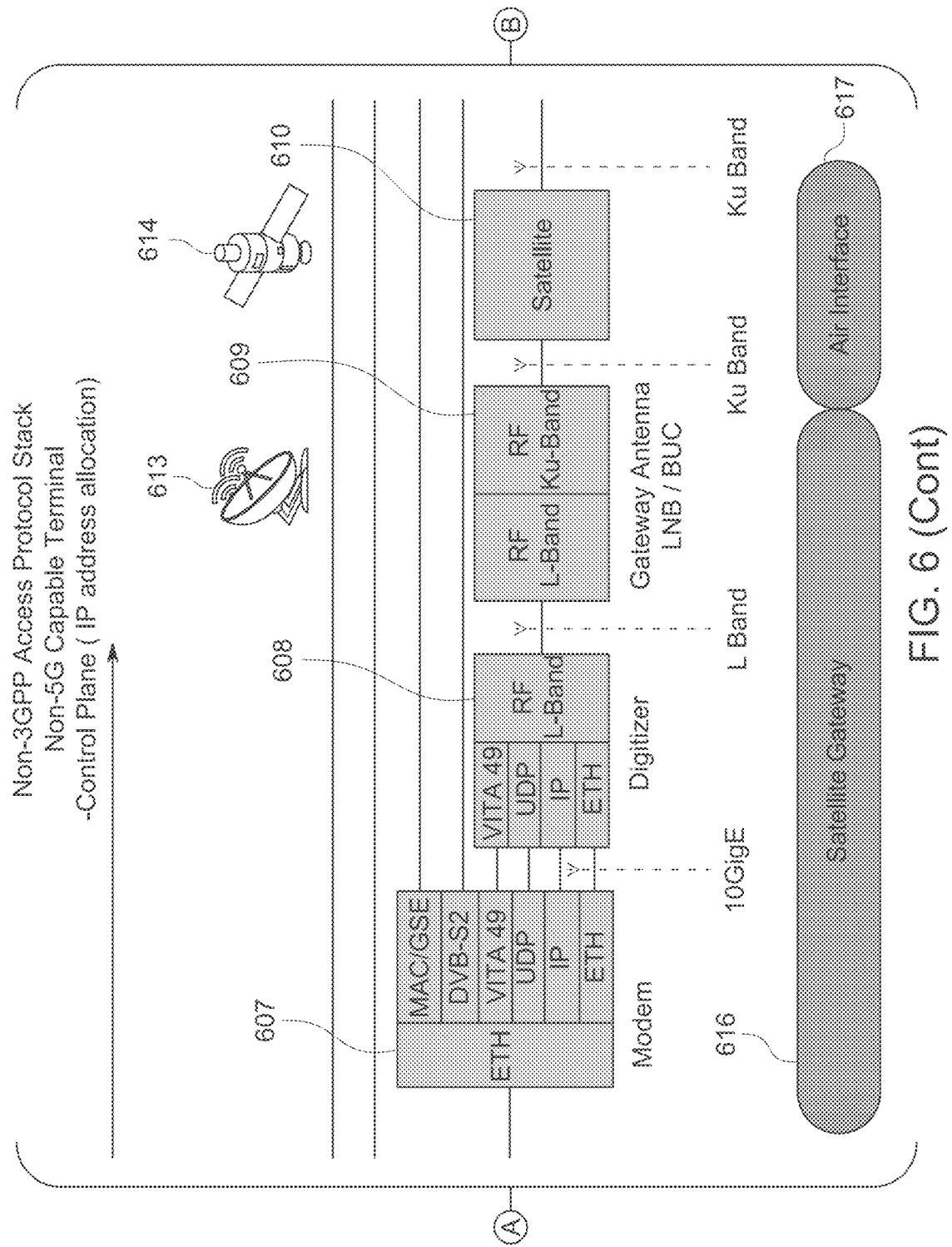
Figure 6:
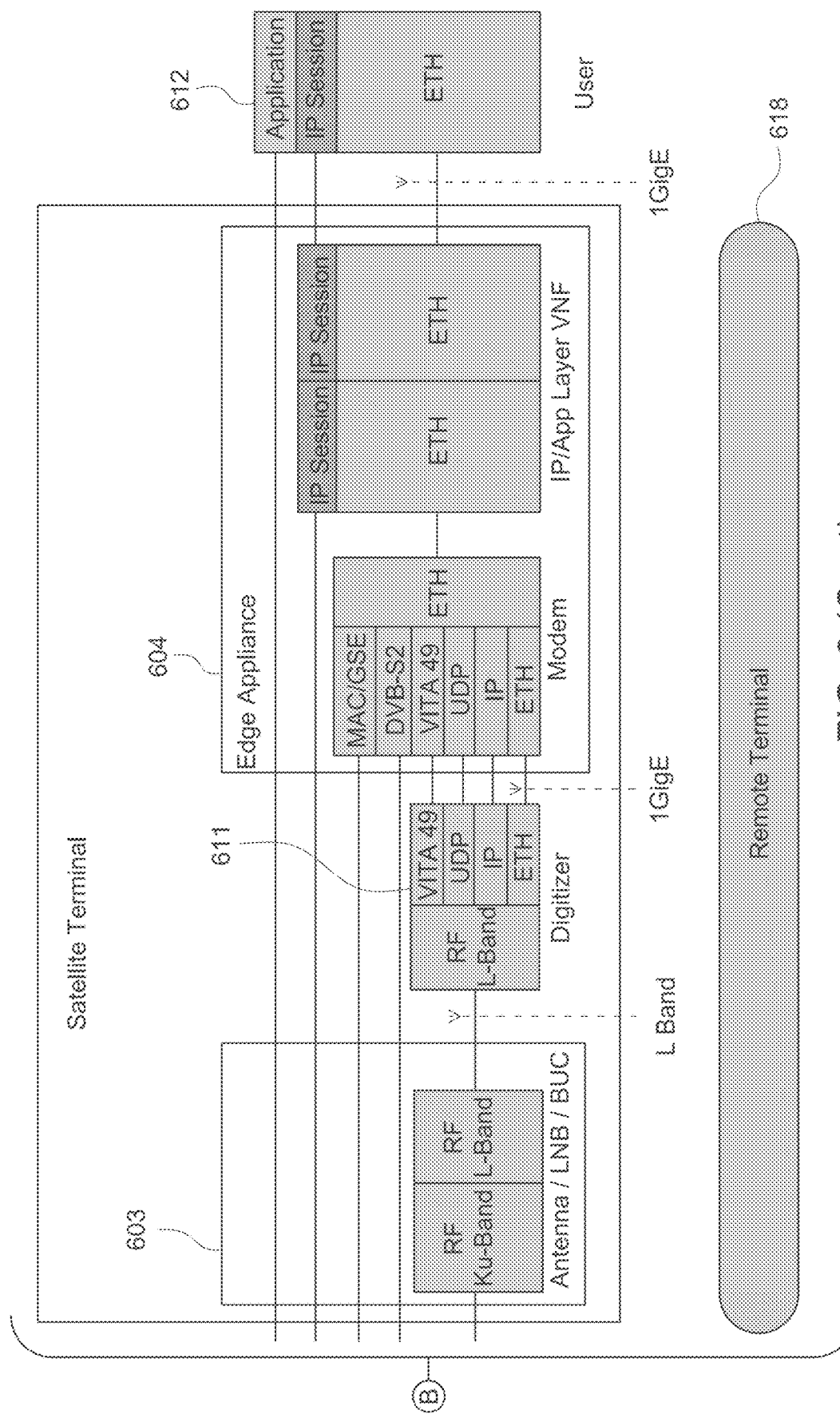
Figure 13:
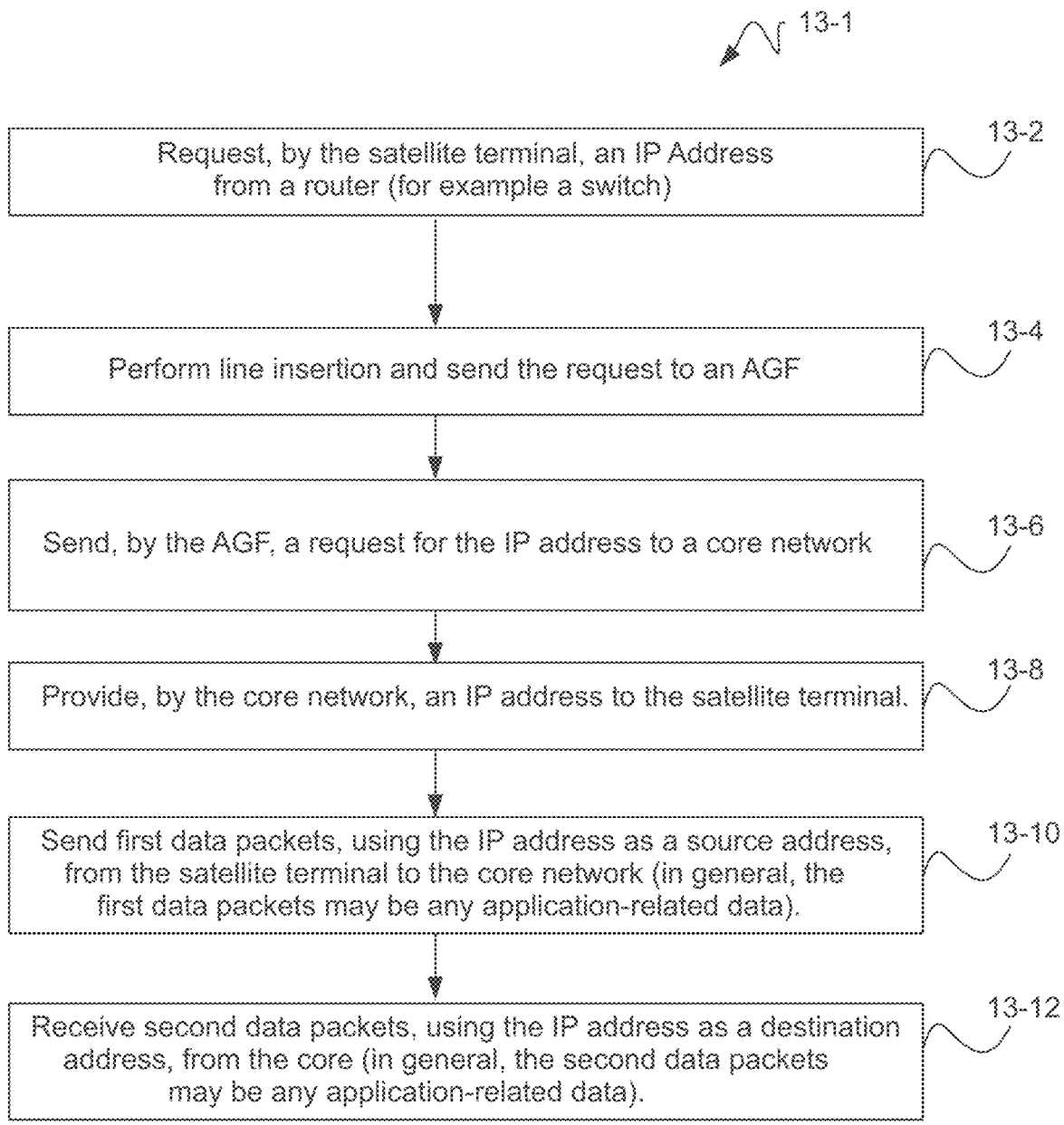
FIG. 13 illustrates a logic flow, according to some embodiments.

The satellite communicates, through a teleport, with a router configured to implement a second DHCP layer (see DHCP functions in switch 505 of FIG. 5). FIG. 13 operation 13-2. The router may be a switch, for example, a Juniper spine switch, but this is a non-limiting example. The router communicates with a gateway. FIG. 13 operation 13-6. The gateway is configured to implement a third DHCP layer (see FIG. 5, AGF 502); and communicate with the cellular core network node of a cellular network (FIG. 5 item 502, FIG. 13 item 13-6). The cellular core network node is configured to implement a second IP layer (FIG. 6 core 601, IP layer).

Figure 8:
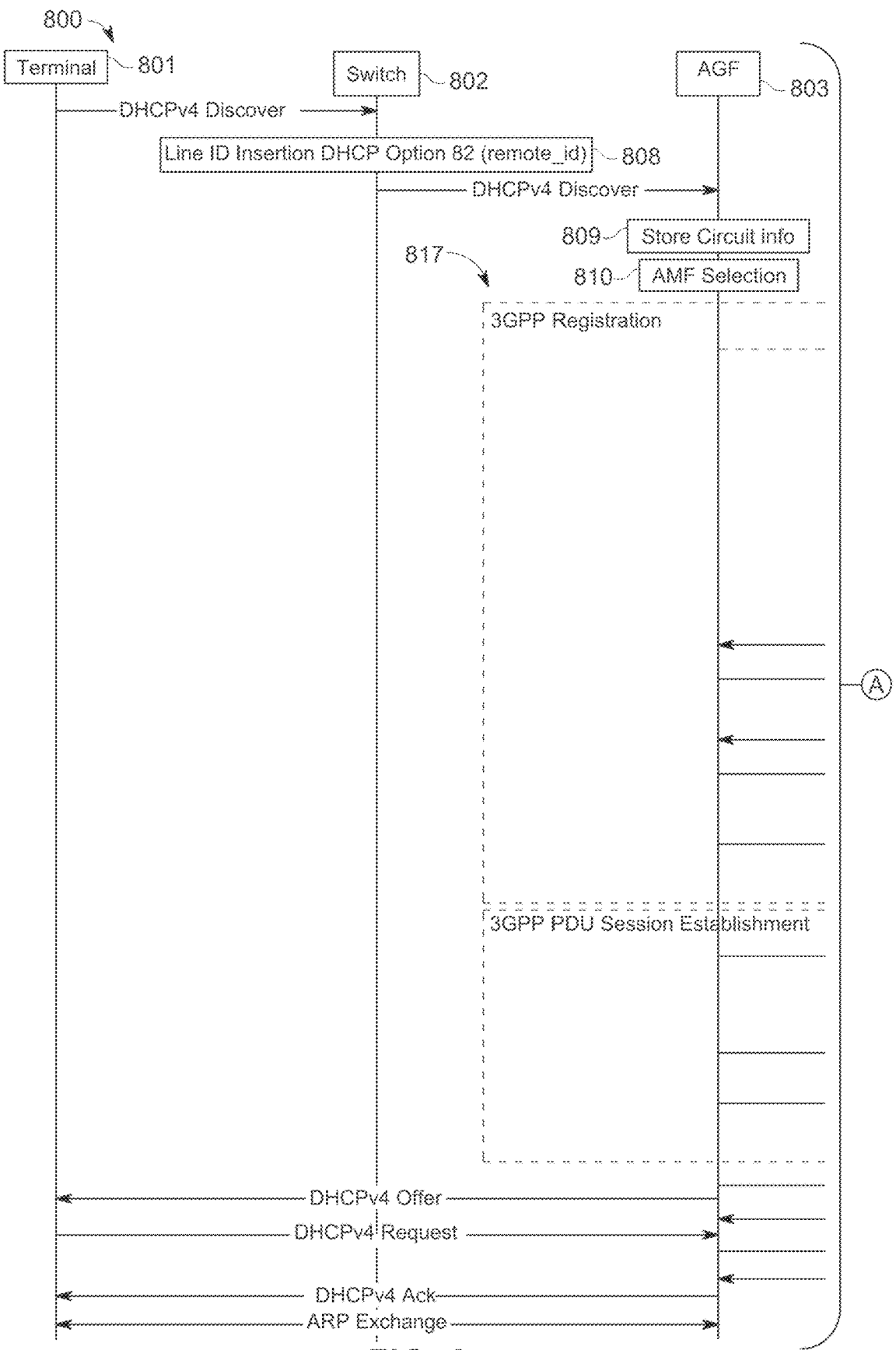
FIG. 8 is an example of a detailed level terminal consumer premises equipment (CPE) session initiation procedure, according to some embodiments.
Figure 8:
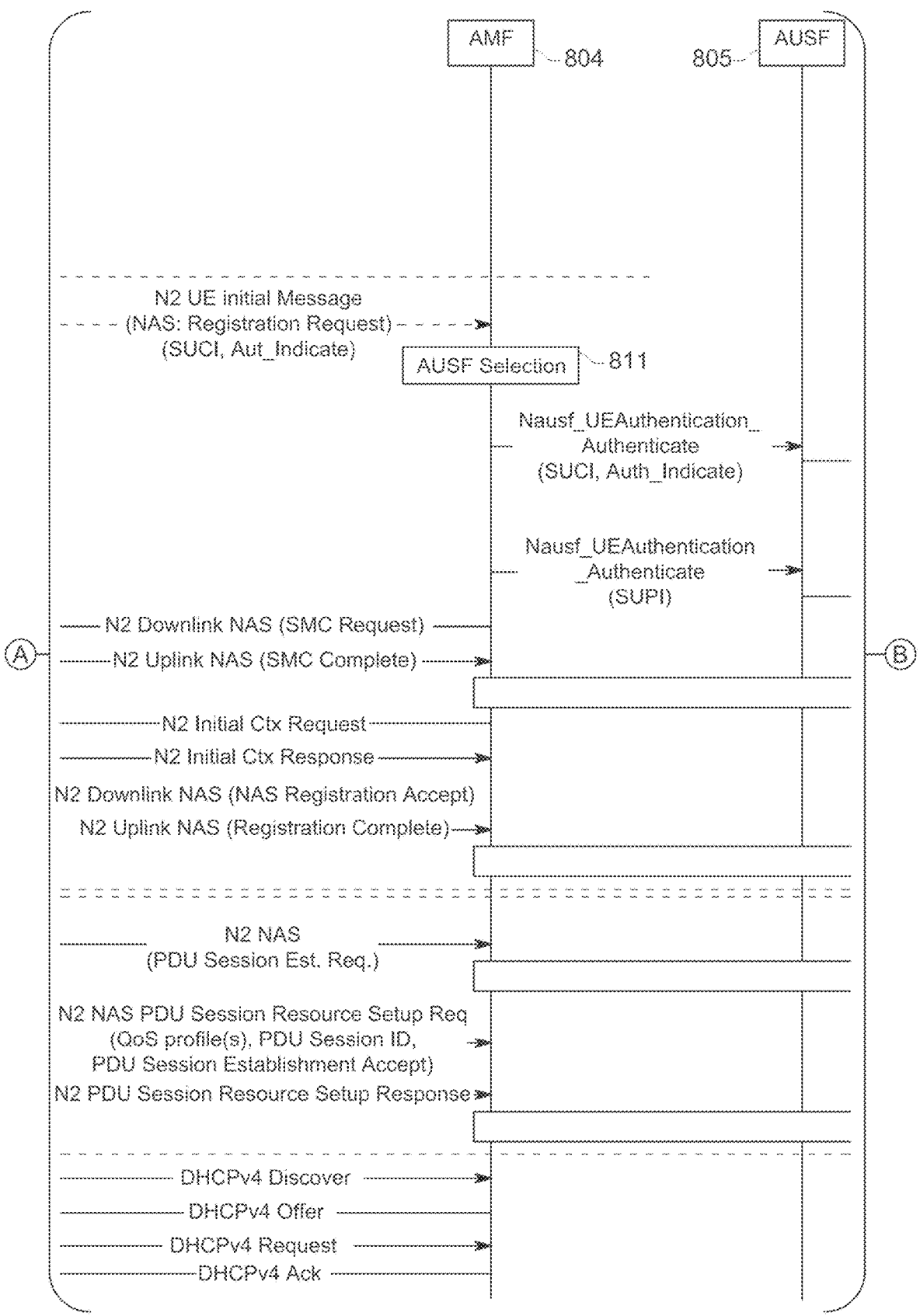
Figure 8:
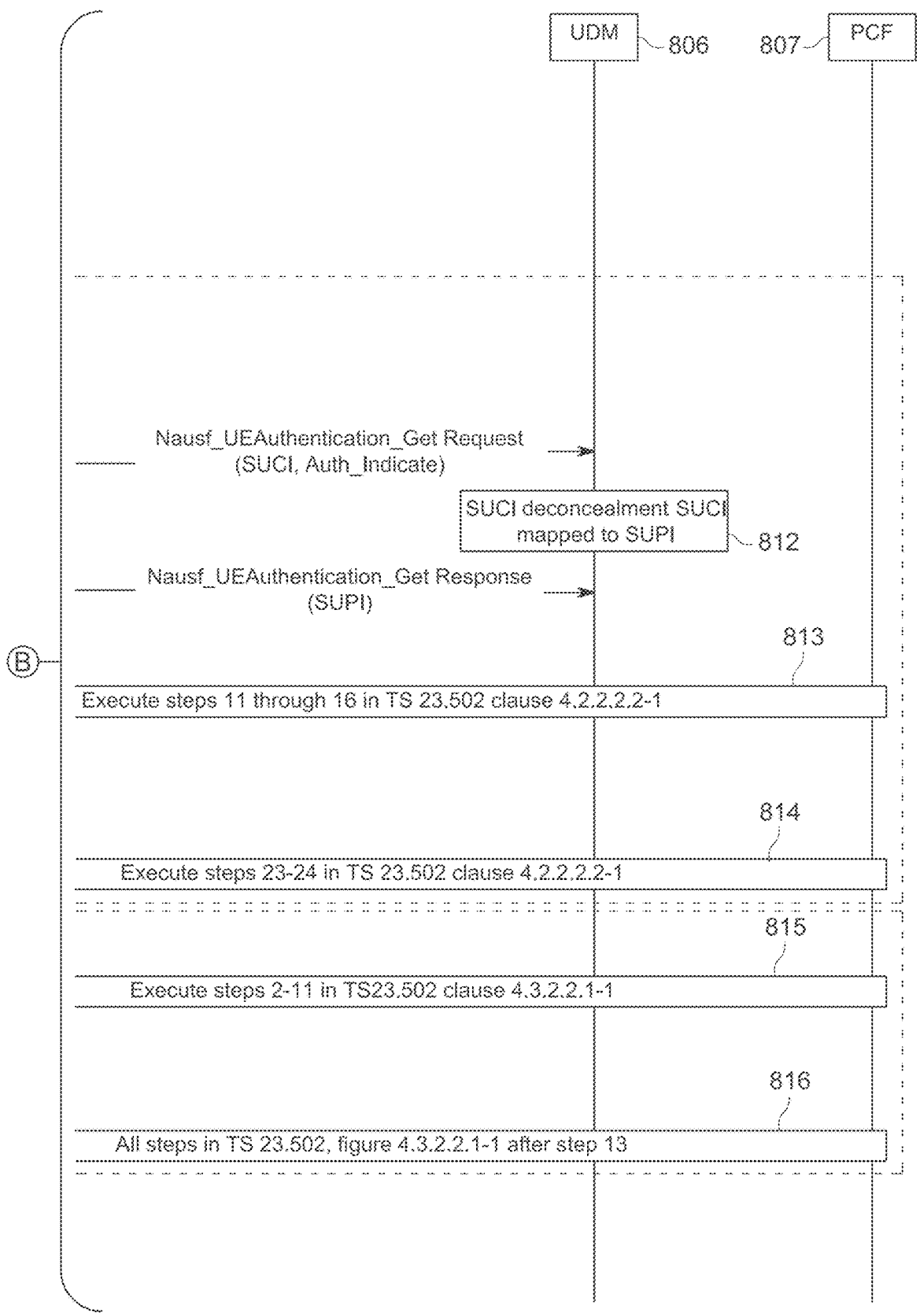

The satellite terminal is also configured to request, via the satellite, an IP address with the assistance of the gateway (see FIG. 4 generally, also FIG. 8 generally).

The router is also configured to identify the request from the satellite terminal and request the IP address from the gateway using a request message (FIG. 4 DHCP Request).

The gateway is also configured to request, with a related request message, the IP address from the cellular core network node (FIG. 13 item 13-6), receive the IP address from the cellular core network node, and send, via the router, the IP address to the satellite terminal (FIG. 4, ARP exchange, FIG. 13 item 13-8).

The satellite terminal is also configured to send, via the first IP layer to the second IP layer, first packets bearing first user content to the cellular network using the IP address as a source address, (FIG. 13 item 13-10) and receive, via the first IP layer from the second IP layer, second packets bearing second user content from the cellular network, the second packets identifying the IP address as a destination address (FIG. 13 item 13-12).

In some embodiments, the router is also configured to insert a first identifier of the satellite terminal in a DHCP option 82 remote_id field of the first request message, wherein the first identifier is a MAC address of the satellite terminal, and send the first request message to the gateway. FIG. 13 item 13-4.

In some embodiments, the gateway is also configured to receive the first request message, compose a second identifier is a network specific identifier (NSI) based on the first identifier, wherein the second identifier is a subscription permanent identifier (SUPI), request the IP address using the second request message by sending the second identifier to the cellular core network node, and receive the IP address from a Session Management function (SMF) of the cellular core network node.

FIG. 6 is an example of a user plane stack diagram illustrating connectivity within the system, according to an embodiment. FIG. 7 is an example of an AGF with a 5G core and end-to-end quality of service (QoS), according to an embodiment. The AGF may also be configured, in some embodiments, to map QoS parameters in use by the terminal at the ETH level to 5QI parameters. For example, a DHCP discovery message from the terminal may include a quality of service (QoS) parameter indicating a first QoS level desired by the terminal. Thus, packets originating at the terminal are then routed by the router toward a destination node (DN) over network bearers supporting the first QoS level, and the AGF is further configured to map the first QoS level to a first 5G QoS Class Identifier (QCI) (5QI) level by a first 5QI parameter. Then, user plane packets from the terminal are forwarded by the AGF over network bearers configured by the 5QI parameter. In the direction of data plane (user plane) flow toward the terminal, packets are forwarded by the AGF configured by the 5QI parameter. The data packets headed toward the terminal may originate at a DN coupled to the 5G Core.

In some instances, the QoS parameter includes three bits, each instance of the QoS parameter indicating one of eight QoS configurations and the QoS parameter is an Ethernet QoS parameter. In some embodiments, the QoS parameter is an IEEE 802.1Q/ad ETH (Ethernet) priority field.

Figure 10:
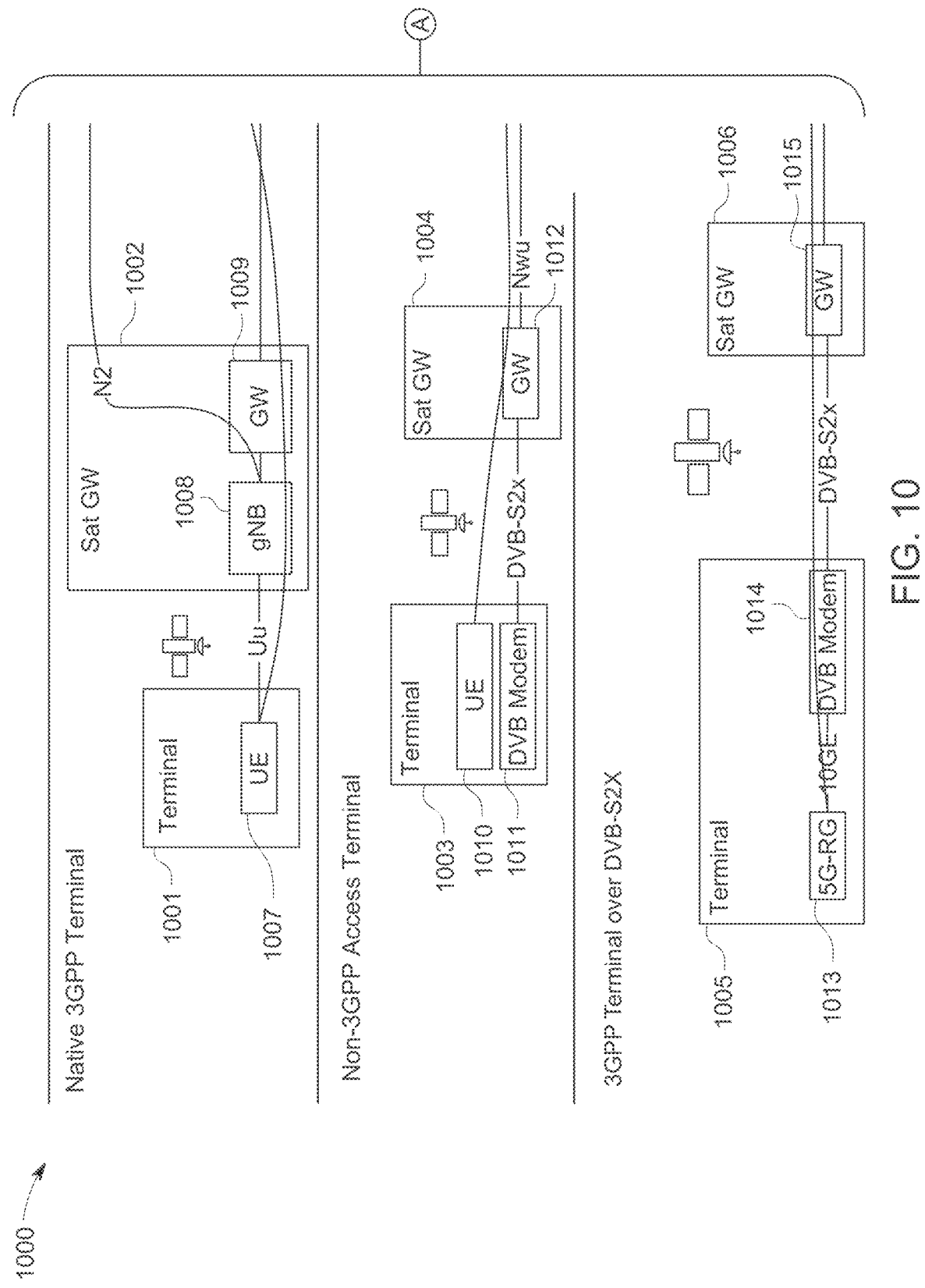
FIG. 10 is an example of 5G access alternatives, according to some embodiments.
Figure 10:
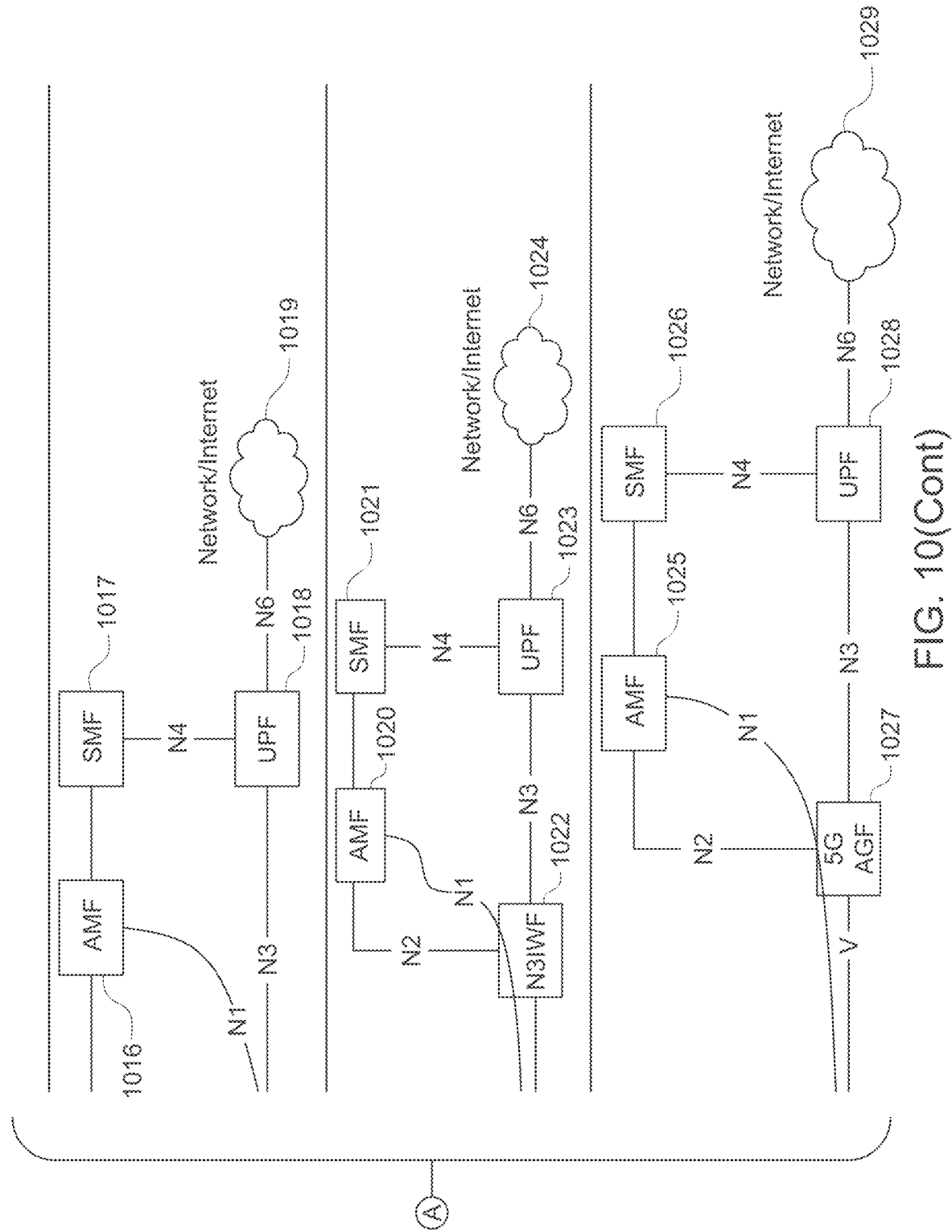

In FIG. 10, the bottom flow or tier identifying a "3gpp terminal over traditional DVB-S2x" illustrates an example architecture and flow of the embodiments provided herein.

Figure 11:
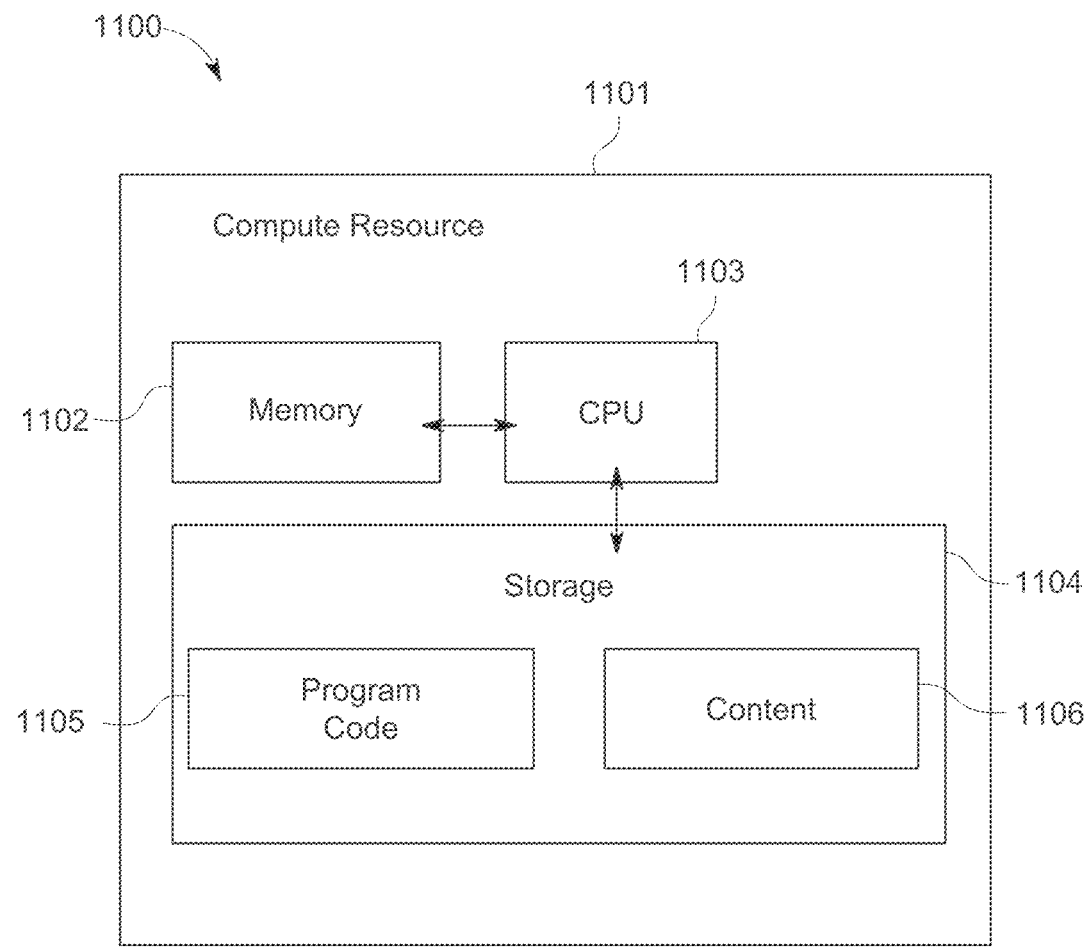
FIG. 11 is an example of a compute resource, according to some embodiments.

FIG. 11 is an example of a compute resource, according to some embodiments. The compute resource may include one or more central processing units (CPUs), one or more memories, and a storage. The storage may store program code and/or content. The program code may be loaded by the one or more CPUs into the one or more memories and executed. The program code may include specific code for implementing the satellite terminal and/or the functionality thereof, the satellite teleport and/or the functionality thereof, the AGF, the gateway, and/or the switch. Accordingly, the program code, loaded into the one or more memories and executed by the one or more CPUs may implement the functions of any of the components described above in FIGS. 1-10 and 12-13.

Figure 12:
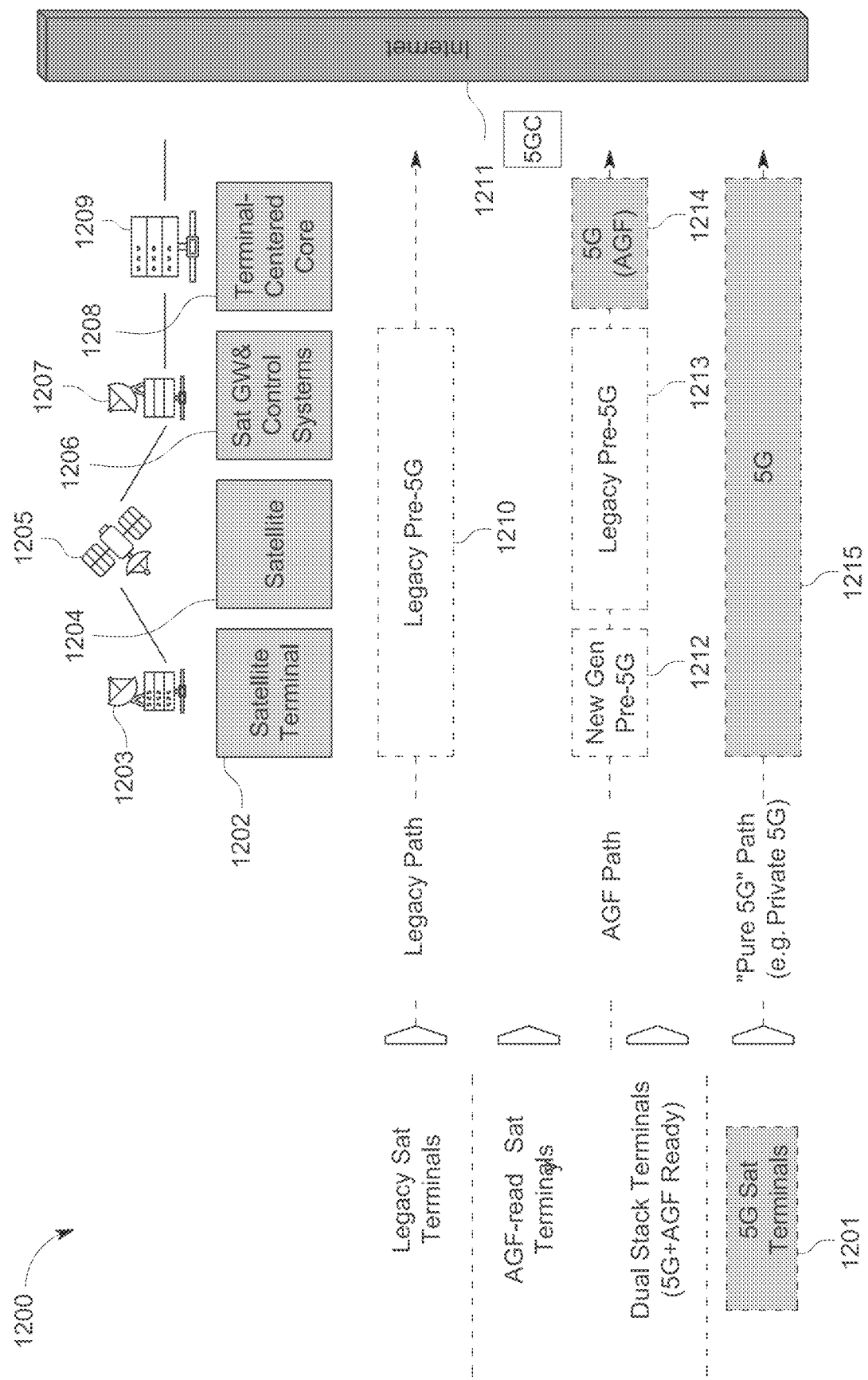
FIG. 12 is an example of a migration path from support of legacy satellite terminals through to 5G satellite terminals, according to some embodiments.

FIG. 12 illustrates a migration path (1200) according to some embodiments.

At the top of FIG. 12, a satellite terminal (item 1202, also represented as item 1203), communicates with a satellite (1204/1205). The satellite communicates with a satellite gateway (GW) and control systems (1206/1207). The satellite gateway and control systems communicate with a terminal-centered core (1208/1209) which communicates with the Internet 1211. An example of the terminal-centered core (1208/1209) is a 5G Core. Items 1202, 1204, 1206, 1208, in some embodiments, are applicable to the corresponding infrastructure items directly below. For example the terminal-centered core (1208/1209) applies to the Legacy Path, the AGF Path and to the Pure 5G Path.

FIG. 12 is illustrated as three paths: legacy path, AGF path and pure 5G path.

The legacy path with architecture indicated generally as (1210), suffers the problems of no seamless roaming (poor mobility) and difficulty in reaching the Internet using the services of the 5G core. The legacy path is a comparative example, not an embodiment.

The solution of FIG. 4, 5 and logic flow of FIG. 13 (presented below), corresponds to the AGF path. In the AGF path, the legacy pre-5G architecture is modified to include the new gen pre-5g (1212) (update of satellite terminal to include the DHCP layer), the legacy-pre-5g stacks and equipment (1213), but with the router/switch configured to couple to the AGF as shown in FIGS. 4-5 (indicated as 1214 in FIG. 12).

The migration path (1200) also includes the pure 5G path, in which the 5G satellite terminals (1201) communicate through 5G equipment and stacks (1215) to the Internet (1211), without the AGF.

FIG. 13 illustrates a logic flow 13-1, according to some embodiments.

At operation 13-2, a satellite terminal requests an IP address by communicating with a router, for example a switch.

At operation 13-4, the router performs line insertion and sends the modified message to an AGF.

At operation 13-6, the AGF sends the request for an IP address to a core network.

At operation 13-8, the core network provides the IP address to the satellite terminal.

At operation 13-10, the satellite terminal sends first data packets to the core network. The first data packets may be any application-related data.

At operation 13-12, the core network sends second data packets to the satellite terminal using the IP address as a destination address. The satellite terminal receives the second data packets, which may be any application-related data.

The foregoing description is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

Appendix 1. A system comprising:
a satellite terminal configured to implement a first dynamic host configuration protocol (DHCP) layer and a first internet protocol (IP) layer;
a router configured to implement a second DHCP layer;
a gateway configured to implement a third DHCP layer, and communicate with a cellular core network node of a cellular network, wherein the cellular core network node is configured to implement a second IP layer,
wherein the satellite terminal is configured to transmit a request, via a satellite link, for an IP address from the gateway,
the router generates, based on the request from the satellite terminal, a first request message, wherein the first request message includes information about a network location of the satellite terminal, and
the gateway:
requests, with a second request message, the IP address from the cellular core network node,
receives the IP address from the cellular core network node,
sends, via the router, the IP address to the satellite terminal, and
the satellite terminal sends, via the first IP layer to the second IP layer, first packets, and receives, via the first IP layer from the second IP layer, second packets.

Appendix 2. The system of Appendix 1, wherein the information about the network location of the satellite terminal is a MAC address of the satellite terminal.

Appendix 3. The system of Appendix 1 or Appendix 2, wherein the satellite terminal is a DHCP client, the router functions as a DHCP relay in a control plane, and the first request message includes an encapsulation of the MAC address in a payload of the first request message.

Appendix 4. The system of Appendix 1, Appendix 2, or Appendix 3, wherein the gateway maintains a table including the IP address and the MAC address, and the table is configured to accept the IP address as an index and provide the MAC address in response to a table read operation using the IP address as the index.

Appendix 5. The system of Appendices 1-4, wherein the satellite terminal requests the IP address using a DHCP discovery message.

Appendix 6. The system of Appendices 1-5, wherein the DHCP discovery message includes a quality of service (QoS) parameter indicating a first QoS level desired by the satellite terminal.

Appendix 7. The system of Appendices 1-6, wherein the first packets are routed by the router toward a destination node (DN) over network bearers supporting the first QoS level, and the gateway is further configured to map the first QoS level to a first 5G QoS Class Identifier (QCI) (5QI) level by a 5QI parameter.

Appendix 8. The system of Appendices 1-7, wherein the first packets are forwarded by the gateway over network bearers configured by the 5QI parameter.

Appendix 9. The system of Appendices 1-8, wherein the second packets are forwarded to the gateway over second network bearers configured by the 5QI parameter, wherein the second packets originate at the DN.

Appendix 10. The system of Appendices 1-9, wherein the QoS parameter includes three bits, each instance of the QoS parameter indicating one of eight QoS configurations.

Appendix 11. The system of Appendices 1-10, wherein the QoS parameter includes an Ethernet QoS parameter.

Appendix 12. The system of Appendices 1-11, wherein the QoS parameter includes an IEEE 802.1Q/ad ETH (Ethernet) priority field.

Appendix 13. The system of Appendices 1-12, wherein the router functions as an edge router.

Appendix 14. The system of Appendices 1-13, wherein the router functions as a datacenter spine switch.

Appendix 15. The system of Appendices 1-14, wherein the router is a DHCP relay configured to receive the DHCP Discovery message at a DHCP layer of a first protocol stack, use first conventional inter-layer primitives to push the DHCP Discovery message down to Ethernet (ETH) layer obtaining a first ETH message, move the ETH message to a second stack, use second conventional inter-layer primitives to move the ETH message up through an IEEE 802.1Q/ad layer, an IP layer, to a DHCP layer supporting option 82 and encapsulate the MAC address in the first request message at the DHCP layer supporting option 82.

Appendix 16. The system of Appendices 1-15, wherein the router functions as a DHCP server.

Appendix 17. The system of Appendices 1-16, wherein the router and the gateway are co-located in a Teleport.

Appendix 18. The system of Appendices 1-17, wherein the router and the gateway are configured to support traffic flows from about 100,000 satellite terminals.

Appendix 19. A system comprising:
a satellite terminal configured to implement a first dynamic host configuration protocol (DHCP) layer and a first internet protocol (IP) layer;
a satellite;
a teleport switch configured to implement a second DHCP layer;
a gateway configured to implement a third DHCP layer, and communicate with a cellular core network node of a cellular network, wherein the cellular core network node is configured to implement a second IP layer,
wherein the satellite terminal is configured to transmit a request, via the satellite, for an IP address from the gateway,
the teleport switch generates, based on the request from the satellite terminal, a first request message, wherein the first request message includes information about a network location of the satellite terminal,
the gateway:
requests, with a second request message, the IP address from the cellular core network node,
receives the IP address from the cellular core network node, and
sends the IP address to the satellite terminal, and
the satellite terminal sends, via the first IP layer to the second IP layer, first packets bearing first user content to the cellular network using the IP address as a source address, and receives, via the first IP layer from the second IP layer, second packets bearing second user content from the cellular network, the second packets identifying the IP address as a destination address,
wherein the teleport switch is further configured to:
insert a first identifier of the satellite terminal in a DHCP option 82 remote_id field of the first request message, and send the first request message to the gateway, the gateway receives the first request message, generates a second identifier as a network specific identifier (NSI) based on the first identifier, requests the IP address using the second request message by sending the second identifier to the cellular core network node, and receives the IP address from a Session Management Function (SMF) of the cellular core network node.

Appendix 20. The system of Appendix 19, wherein the first identifier is a MAC address of the satellite terminal.

Appendix 21. The system of Appendices 19-20, wherein the second identifier is a subscription permanent identifier (SUPI).

Appendix 22. A migration method of migrating a legacy satellite network including a satellite terminal and a satellite teleport, to a 5G core, the migration method comprising:
- modifying the satellite terminal to add an edge router function, the edge router function handling layer-3 IP addressing and sending a DHCP request including a MAC address of the satellite terminal, over a satellite connection, to a DHCP relay in the satellite teleport;
- modifying the satellite teleport to add an access gateway function (AGF), the AGF receiving the DHCP request including the MAC address of the satellite terminal, generating a unique subscription permanent identifier (SUPI), proxying connections to a 5G Core, starting a protocol data unit (PDU) session, receiving an IP address from a Session Management Function (SMF), and forwarding the IP address to the satellite terminal as a terminal IP address.

The invention claimed is:

1. A system comprising:
- a satellite terminal configured to implement a first dynamic host configuration protocol (DHCP) layer and a first internet protocol (IP) layer;
- a satellite;
- a teleport switch configured to implement a second DHCP layer;
- a gateway configured to implement a third DHCP layer, and communicate with a cellular core network node of a 5G cellular network, wherein the cellular core network node is configured to implement a second IP layer, wherein the satellite terminal is configured to transmit a request, via the satellite, for an IP address from the gateway, the teleport switch generates, based on the request from the satellite terminal, a first request message, wherein the first request message includes information about a network location of the satellite terminal, the gateway:
- requests, with a second request message, the IP address from the cellular core network node,
- receives the IP address from the cellular core network node, and
- sends the IP address to the satellite terminal, and the satellite terminal sends, via the first IP layer to the second IP layer, first packets bearing first user content to the cellular network using the IP address as a source address, and receives, via the first IP layer from the second IP layer, second packets bearing second user content from the cellular network, the second packets identifying the IP address as a destination address, wherein the teleport switch is further configured to:
- insert a first identifier of the satellite terminal in a DHCP option 82 remote_id field of the first request message, and send the first request message to the gateway, the gateway receives the first request message, generates a second identifier as a network specific identifier (NSI) based on the first identifier, requests the IP address using the second request message by sending the second identifier to the cellular core network node, and receives the IP address from a Session Management Function (SMF) of the cellular core network node.

2. The system of claim 1, wherein the first identifier is a MAC address of the satellite terminal.

3. The system of claim 2, wherein the second identifier is a subscription permanent identifier (SUPI).

\* \* \* \* \*